United States Patent [19]

Leffew et al.

[11] Patent Number: 4,804,556

[45] Date of Patent: Feb. 14, 1989

[54] EDGE THICKNESS CONTROL SYSTEM

[75] Inventors: Kenneth W. Leffew, Kennett Square, Pa.; Joseph D. Trentacosta, Wilmington, Del.

[73] Assignee: E. I. Du Pont de Nemours and Company, Wilmington, Del.

[21] Appl. No.: 646,172

[22] Filed: Aug. 30, 1984

[51] Int. Cl.[4] ............................................. B05C 5/02
[52] U.S. Cl. ........................................ 427/9; 118/665; 118/696; 118/410; 264/40.1; 425/141; 425/466
[58] Field of Search .................. 427/9, 10; 264/40.1; 425/141, 466; 118/663, 665, 696, 410

[56] References Cited

U.S. PATENT DOCUMENTS

| | | | |
|---|---|---|---|
| 3,940,221 | 2/1976 | Nissel | 425/466 X |
| 4,454,084 | 6/1984 | Smith et al. | 264/40.1 |
| 4,507,073 | 3/1985 | Shelton | 425/141 X |

Primary Examiner—John McIntosh

[57] ABSTRACT

A control system for controlling the edge thickness of an extrudate includes an arrangement responsive to a signal representative of the monitored thickness of the extrudate emanating from a die slot controlled by a transversely inward heating element for generating a control set point for that heating element and for a heating element controlling the die slot adjacent a lateral edge thereof.

1 Claim, 14 Drawing Sheets

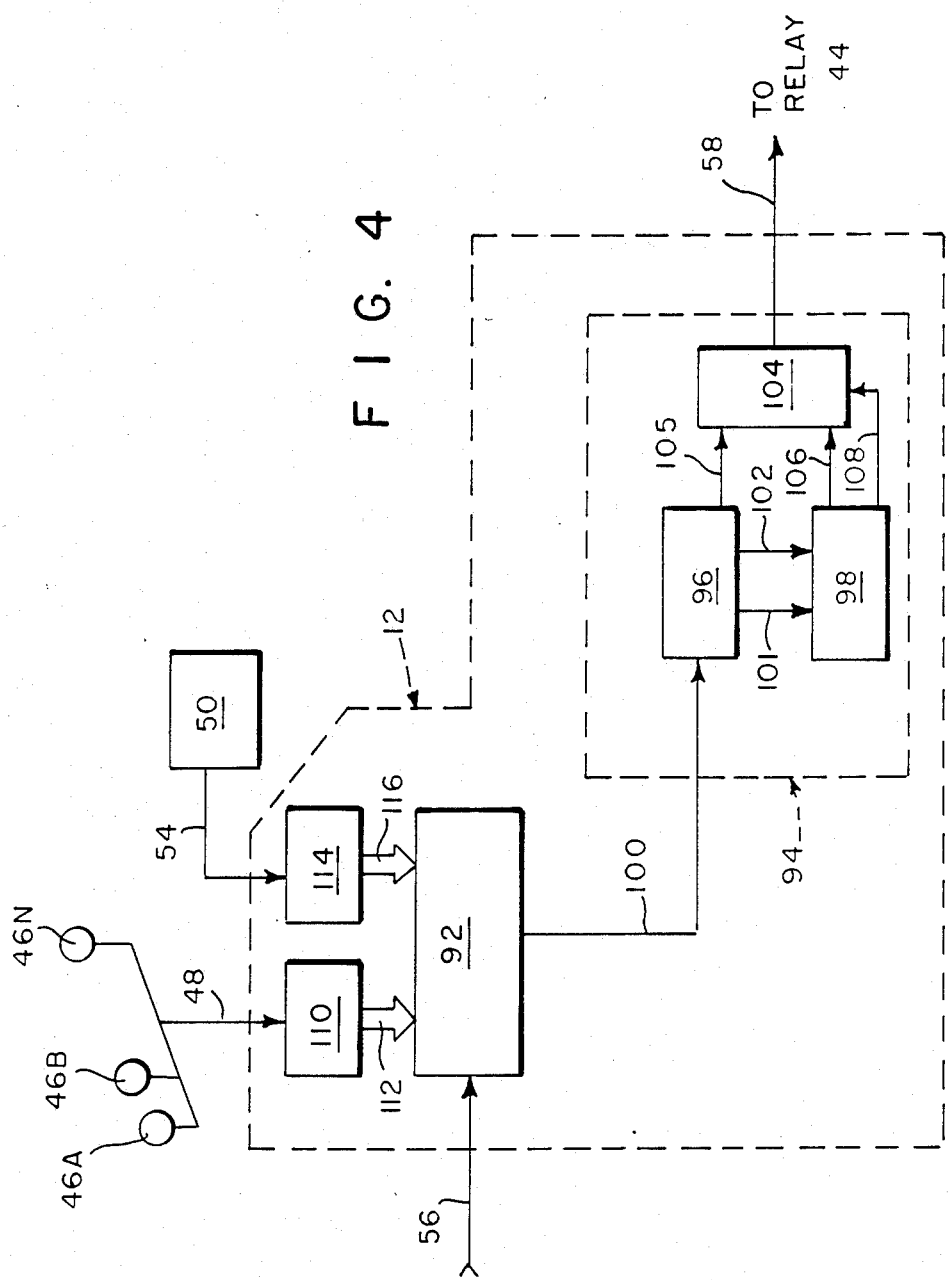

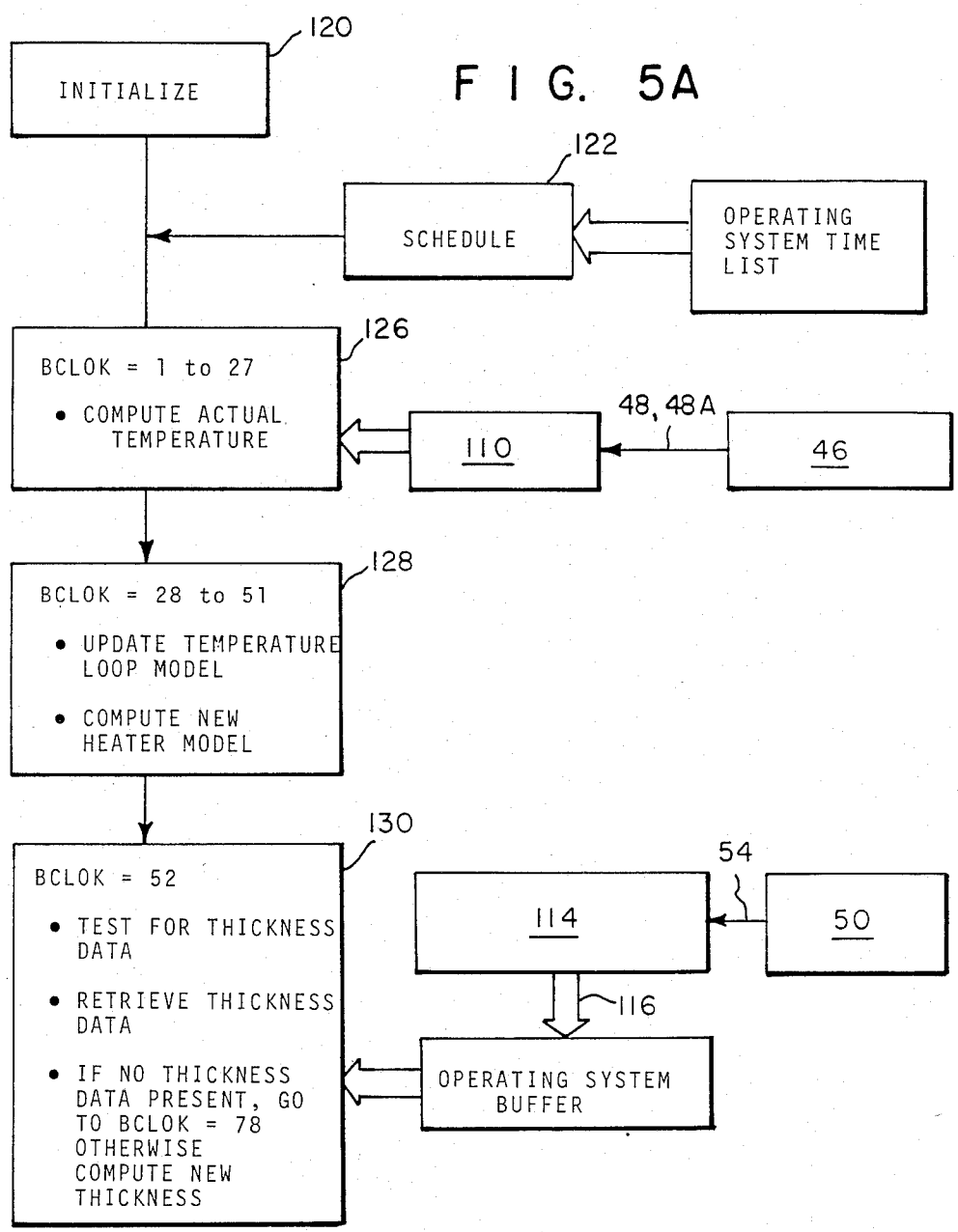
F I G. 5A

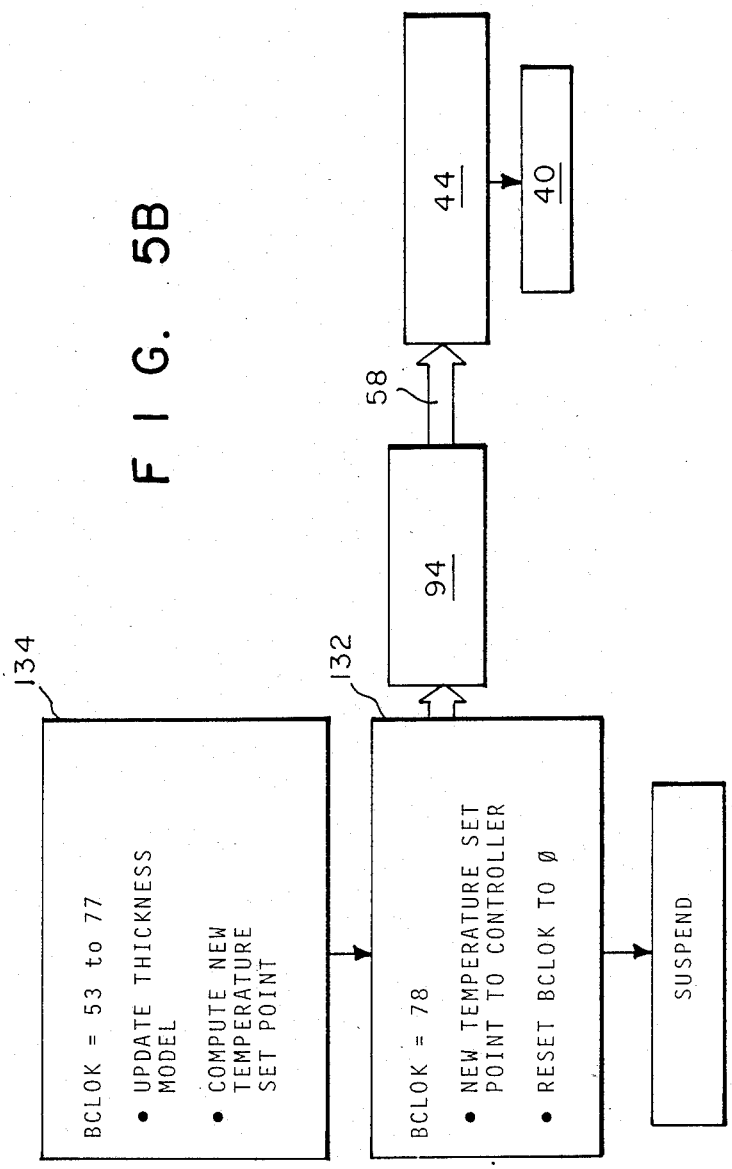

EDGE THICKNESS CONTROL SYSTEM

FIELD OF THE INVENTION

This invention relates to a control system for an extrusion coating apparatus using a heat responsive element to modulate the coating die slot dimension and, in particular, to a control system wherein the thickness of the extrudate along the lateral edges thereof is controlled.

DESCRIPTION OF THE PRIOR ART

An extrusion coating apparatus is a device wherein a composition is forced under pressure through an opening, or slot, defined between a confronting pair of relatively massive members called dies. One die includes a relatively flexible flange, or lip, which extends transversely of the die while the other of the dies carries a fixed lip also extending transversely of the die. The slot dimension is defined by the perpendicular distance between corresponding points on the lips of the confronting dies and it is this slot dimension which determines the thickness of the extrudate emanating from the apparatus.

In practice the extrudate may be deposited onto a suitable substrate or may form a film which is carried by a suitable conveyer arrangement. The thickness of the extrudate, whether deposited on a substrate or extruded in film form, is monitored downstream of the dies by a suitable gauge. Depending upon the measured thickness the slot dimension is appropriately modified.

One well known device for controlling the slot dimension involves the use of a plurality of heat responsive expansion bolts arrayed in spaced apart relationship across the transverse dimension of one die. Typical of such expansion bolts are those manufactured and sold by Thermac Corp. Each bolt operates against a localized portion of the flexible lip of the die on which the bolt is mounted. Dependent upon the duration of the excitation signal applied thereto the heat responsive bolt either expands or contracts from its previous condition to thereby respectively close or open the dimension of the slot in the vicinity of the bolt. Each bolt, therefore, is operative to modify the slot dimension in one of a corresponding plurality of contiguous lanes extending transversely across the width of the die.

The duration of the excitation signal applied to each bolt is functionally related to the thickness of the extrudate emanating from the die in the section of the film affected by that bolt as monitored by the thickness gauge. However, commercially available equipment such as defined above uses minimum sample control intervals on the order of two minutes. This results in a characteristic response time of approximately sixty minutes. The duration of these sample intervals and response times is believed to be unable to provide the degree of thickness control necessary for more critical and precise extruding operations.

The present thickness control scheme has other perceived disadvantages. One relates to the inability to control the thickness of the extrudate deposited in the lanes contiguous to the lateral boundaries of the die. Extruding near these boundaries results in a phenomenon known as "neck-in" in which the extrudate bends inwardly, i.e., away from the edges, and occasions a relatively thicker bead of extrudate forming in these regions. Another perceived disadvantage is the failure to accurately relate monitored thickness of the extrudate to the portion of the die (i.e., the lane) from which that extrudate emanated. Another disadvantage lies in the failure to provide a suitable system backup in the event of controller malfunction. Currently, a controller malfunction would result in the cessation of manipulation over the expansion bolts. Thus, over time after a malfunction, the die slot could achieve an arbitrary form which would lead to undesirable thickness nonuniformity across the web. As a corollary, when system control is restored the controller must readjust the dies to accommodate the deviations introduced during controller down time before thickness control may be reestablished.

In view of the foregoing it is believed advantageous to provide a control system in which increased sample frequency and decreased response times are available. Further, a system for reducing the effects of neck-in is also believed to be of advantage. Yet further, a system which accurately monitors and relates extrudate thickness to the portion of the die from which the extrudate emanated would be advantageous. Still further, a control system which provides a back up control scheme in the event of malfunction is also believed to provide an improvement over prior control systems.

SUMMARY OF THE INVENTION

The present invention relates to an extrusion coating apparatus of the type having a first and a second die, one of the dies having a flexible lip thereon while the other of the dies carries a rigid lip. The lips are spaced apart to define an elongated, transversely extending extrusion slot. An array of heat responsive elements is transversely spaced across the die having the flexible lip to provide localized slot control over each one of a plurality of transversely contiguous lanes. A thickness gauge is disposed downstream of the dies in a location where the thickness of the extrudate from each lane may be monitored. Preferably, a scanning-type gauge is used. Each heat responsive element includes, in the preferred case, a bolt having a heat element arranged in a heat transmissive association therewith.

In accordance with the present invention the thickness control system comprises a nested temperature control network for maintaining the temperature of the heat responsive element associated with a given lane within a predetermined range of a predetermined temperature set point. The temperature set point is generated in response to the monitored thickness of the extrudate. In the preferred embodiment the temperature control network includes a temperature sensing element, such as a thermocouple, physically disposed in a temperature monitoring relationship with the heat responsive element. The monitored temperature is used by the temperature control network to maintain the temperature of the heat responsive element at the predetermined temperature set point derived in accordance with the monitored thickness of the extrudate. Since the temperature control network responds faster to correct deviations from the predetermined temperature set point than the thickness control loop in which it is nested, more effective control of the slot dimension is afforded than is available in prior art systems which manipulate the slot dimension directly on the basis of monitored extrudate thickness. Also included is an arrangement which accurately correlates the monitored thickness of the extrudate with the portion of the die (i.e., the lane) from which that portion of the extrudate emanated so that the appropriate heat responsive elements are controlled to manipulate the appropriate portion of the slot.

The thickness control system also includes an arrangement which adjusts the temperature set point of the heat responsive elements lying within a predetermined range of contiguity to the lateral boundaries of the die based on the change in temperature set point of a selected one of the more laterally interior heat responsive elements. Such an arrangement serves to reduce the deleterious effects of extrudate neck-in.

The thickness control system further includes an arrangement which monitors the duration of the excitation signal (i.e., duty cycle) for each heat responsive element and maintains a running average thereof which is updated at predetermined intervals. In the event of system malfunction the current duty cycle signal for each element, based on the historical trend of temperature control for that element, is used as the control output until real-time control is restored.

Preferably the thickness control system is implemented by a distributed computer system. A host computer is used to calculate updated temperature set points based on monitored thickness measurements and the corresponding heater duty cycle time required to maintain the actual temperature at the set point. Each bolt has a dedicated software control loop executed by the host. The distributed control system also includes a primary and auxiliary microcomputer. The primary microcomputer serves to control the required duty cycle of the heaters for all the heat responsive elements. The auxiliary microcomputer tracks the duty cycle of the elements, generates the historical trend in the form of running averages and, in the event of host failure, supplies this information to the primary microcomputer to use for the heater control until host operability is restored.

BRIEF DESCRIPTION OF THE DRAWINGS

The invention will be more fully understood from the following detailed description thereof taken in connection with the accompanying drawings, which form a part of this application and in which:

FIG. 4 is a block diagram of the distributed computation arrangement used in the thickness control system of the present invention;

FIGS. 5A and 5B are a program timing and data flow diagram for the program used in a thickness control system of the present invention;

DETAILED DESCRIPTION OF THE INVENTION

Figure 1:
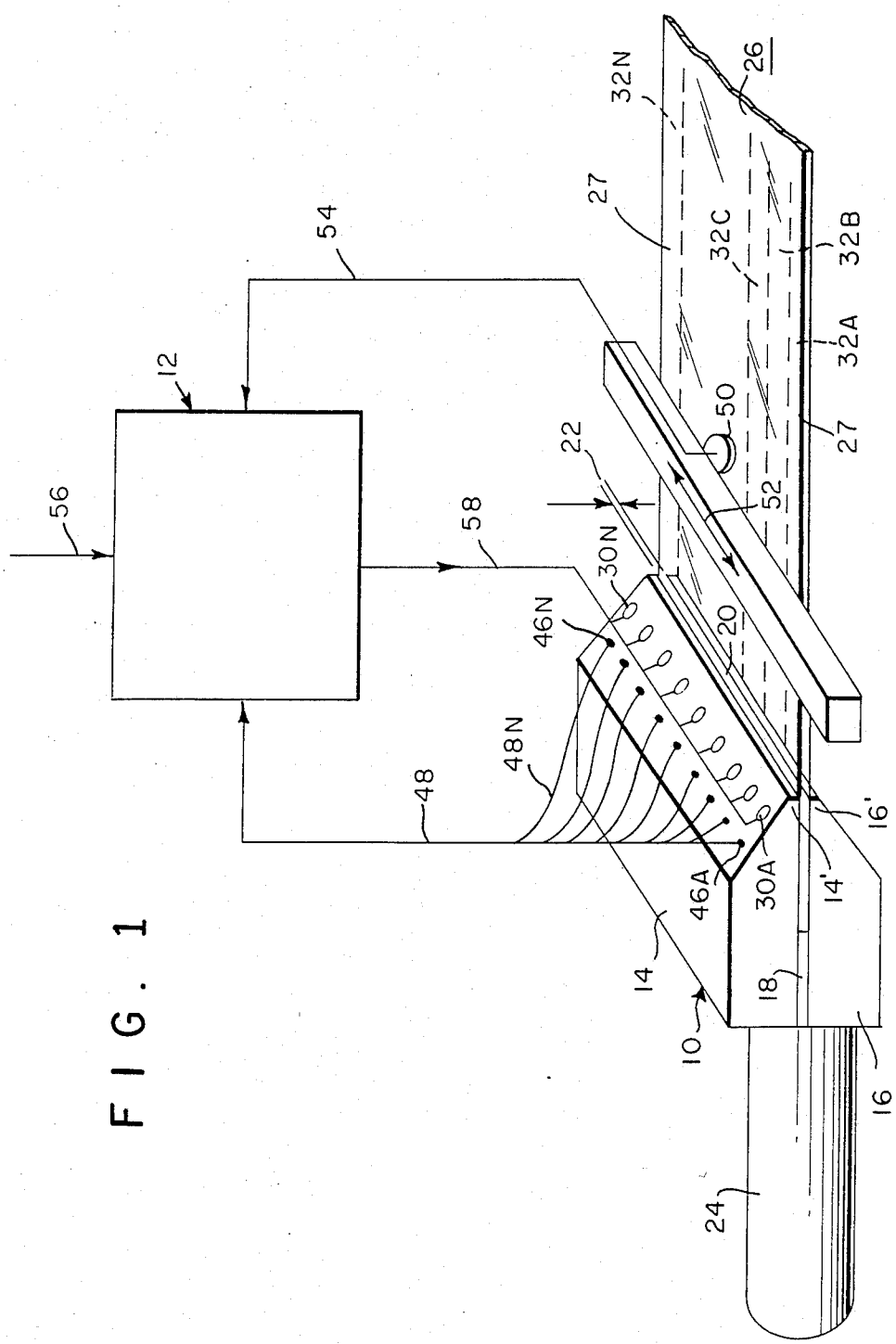
FIG. 1 is a stylized pictorial presentation of an extrusion coating apparatus with which a thickness control system in accordance with this invention may be used.

Throughout the following detailed description similar reference numerals refer to similar elements in all FIGURES of the drawings.

With reference to FIG. 1 shown is a generalized schematic representation of an extrusion coating apparatus generally indicated by reference character 10 with which a thickness control arrangement indicated by reference character 12 may be used. The coating apparatus 10 includes an upper die member 14 and a lower die member 16 separated by a shim 18 to define a transversely extending slot 20 having a thickness dimension 22. The thickness dimension 22 is defined as the perpendicular distance between corresponding confronting points on the dies 14, 16. A composition to be extruded is introduced into the apparatus 10 from an extruder 24. A film 26 of extrudate emanates from the spaced apart dies 14, 16. The film 26 may be beaded in the vicinity of its lateral edges 27 due to the effects of neck-in. The film 26 may be deposited on a suitable substrate or conveyer, both omitted from the FIGURE for clarity. It should be understood that the thickness control arrangement 12 is able to control the thickness of a single film extrudate or the total thickness of a multiplicity of film extrudates, including the control of overall thickness where a single or multiple film extrudate is extruded onto a substrate.

Figure 2:
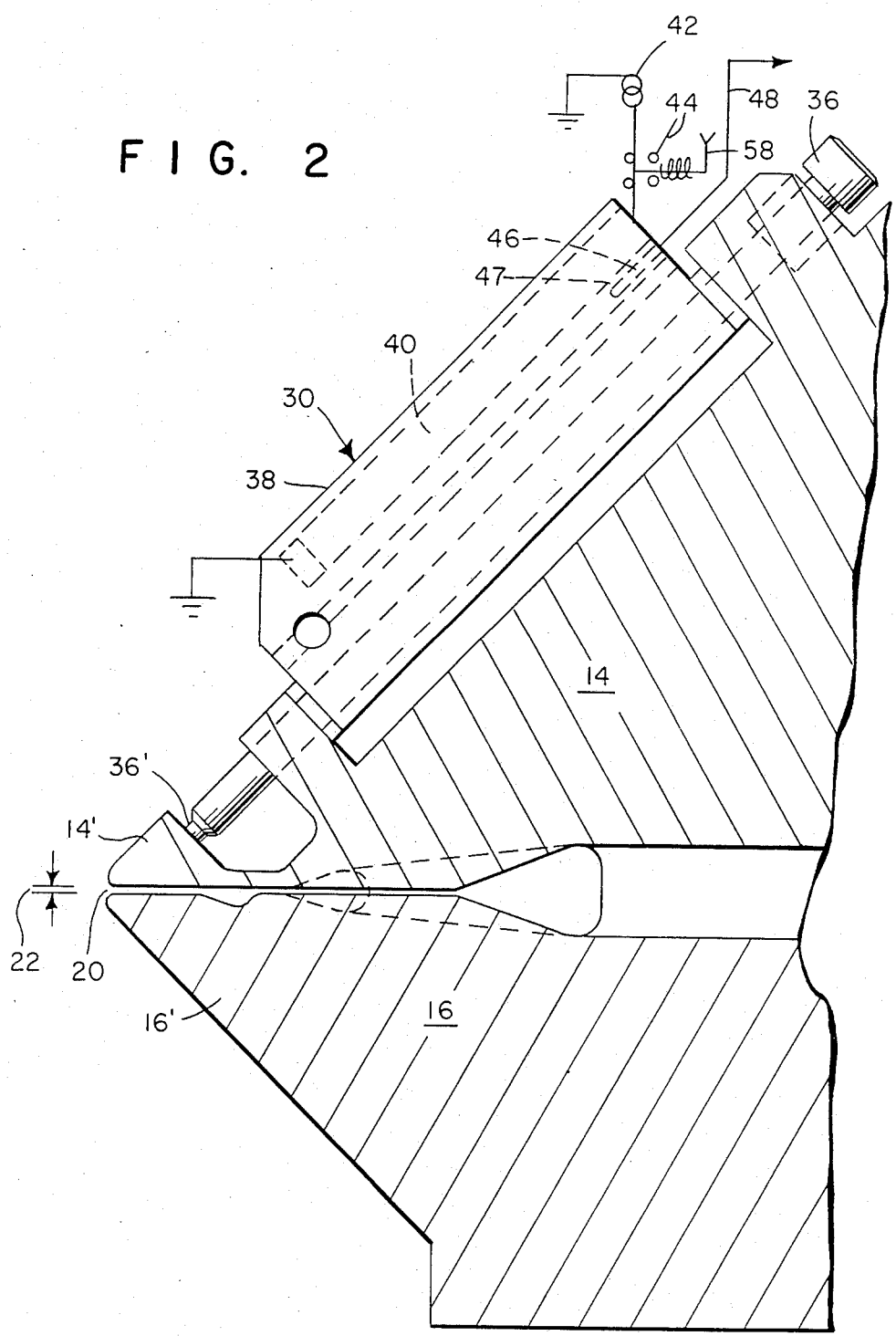
FIG. 2 is a detailed view of the physical mounting of a heat responsive expansion bolt and a temperature monitoring element associated therewith in accordance with the present invention.

As seen in FIG. 2, each die 14, 16 includes a forwardly extending lip 14', 16' respectively. One of the lips, e.g., the lip 14', is flexible while the other of the lips 16' is rigid. Of course, the relative positions of the flexible and rigid lips may be reversed. Also, both of the lips could be flexible and controlled as discussed herein.

An array of heat responsive elements 30 is arranged across the transverse dimension of the upper of the dies 14 having the flexible lip 14' thereon. Each element 30 is operatively associated with the lip 14' and is arranged, as set forth herein, to modulate the thickness dimension 22 of the portion of the slot 20 in the vicinity of the element. Consequently each element 30 may be viewed as controlling the thickness 22 of one of a plurality of N transversely contiguous lanes 32A through 32N arrayed across the transverse dimension of the film 26. It should be understood that any predetermined convenient number N of such lanes may be used. Throughout this application, the use of an alphabetic suffix for any element or function indicates that element or function which corresponds with the lane with which the suffix is associated.

Each of the heat responsive elements 30 is preferably a heat expansion bolt 36 mounted in a block 38 formed of a heat conductive material. The blocks 38 are received in any appropriate receptacle formed in the die 14. A cartridge heater 40 is mounted in a heat transmissive relationship within a suitable recess formed in the block 38. The foot 36' of each of the bolts 36 is abutted against the flexible lip 14L of the die 14. The bolt 36 expands or contracts and thereby narrows or widens the thickness dimension 22 of the portion of the slot 20 in the vicinity thereof. The expansion or contraction of the bolt 36 is controlled by the temperature of the block 38 which temperature is, in turn, dependent upon the magnitude of the electric current flowing in a closed loop including the heater 40 and a source 42. A relay diagrammatically indicated at 44, preferably a solid state relay, controls the application of the current to the heater 40 under the control of the network 12 as discussed herein.

In accordance with this invention a temperature monitoring device, such as a thermocouple 46, is physically mounted in a temperature sensing relationship with the block 38 within a suitably located aperture 47 therewith. The aperture 47 may be located at any convenient position within the block 38. The signal developed by each of the thermocouples 46 is separately conveyed by an associated line 48 to the control network 12. The thickness dimension 22 of the slot 20 in the vicinity of each heat responsive element 30 is, as may be appreciated, functionally related to the temperature of the block 38.

Disposed a predetermined distance from the extrusion apparatus 10 is a thickness gauge 50 arranged to scan transversely in the direction of the arrow 52 and to monitor the thickness of the film 26 in each of the lanes 32A through 32N, respectively. The electrical signal representative of the monitored film thickness is applied via a line 54 to the control system 12. Suitable for use as the gauge 52 is a device sold by LFE Incorporated, Waltham, Mass., under model number 5001. The signals 54A through 54N representative of the thickness of the extrudate in the corresponding lane is derived by a scheme that, once knowing the transferse location of the film edge, beads 27, apportions data from the thickness scan to each bolt lane in accordance with observed neck-in characteristics for that region of the die. An essential part of this process is the identification of the edge beads 27. The program which implements this function is set forth in full in the Appendix.

Figure 3:
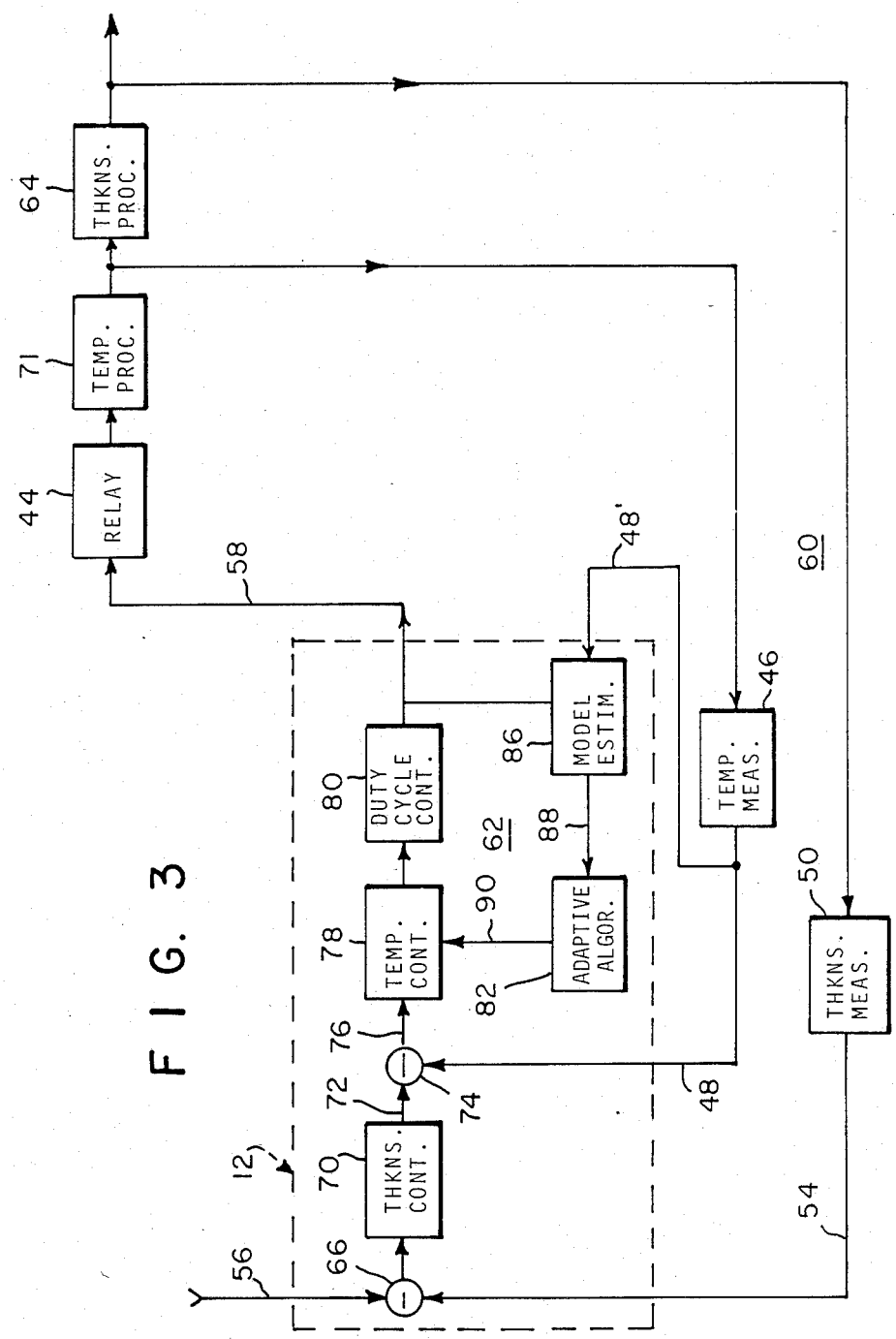
FIG. 3 is a function block diagram of the thickness control system in accordance with the present invention.

The thickness control system 12 in accordance with the present invention is shown in block diagram form in FIG. 3. The system 12 is operative to maintain the thickness of the extrudate within a predetermined range of the thickness reference as selected by an operator and applied to the system 12 as an appropriate reference signal on the line 56. The control system 12 is responsive to the signal representative of the temperature each of the heat responsive elements 30 as derived from the thermocouple 46 associated therewith and applied over the appropriate line 48 and to the signal representative of the thickness dimension 22 of the portion of the slot 20 in the lane corresponding to the element 30 as applied from the gauge 52 over the line 54. The control function is implemented by a control signal applied on a line 58 connected to the relay 44 corresponding to the element 30.

The control system 12 which controls the thickness of the extrudate in each of the lanes 32A through 32N includes, for each lane, an outer thickness control loop 60 and a nested, inner, temperature control loop 62.

A physical process, schematically indicated by the functional block 64, results in the creation of a extrudate having a thickness to be controlled. The physical process is implemented by the coating apparatus 10 described above. The thickness of the extrudate is measured by the gauge 50 and information representative thereof applied over the line 54 where it is subtracted at a junction 66 from the thickness set point signal selected by an operator and applied on the line 56. A thickness control algorithm represented by the functional block 70 (a program impelementing the same being shown in flow diagram form in FIGS. 6A and 6B) generates on a line 72 a temperature set point which is used to generate a reference for the inner temperature control loop 62.

Figure 7A:
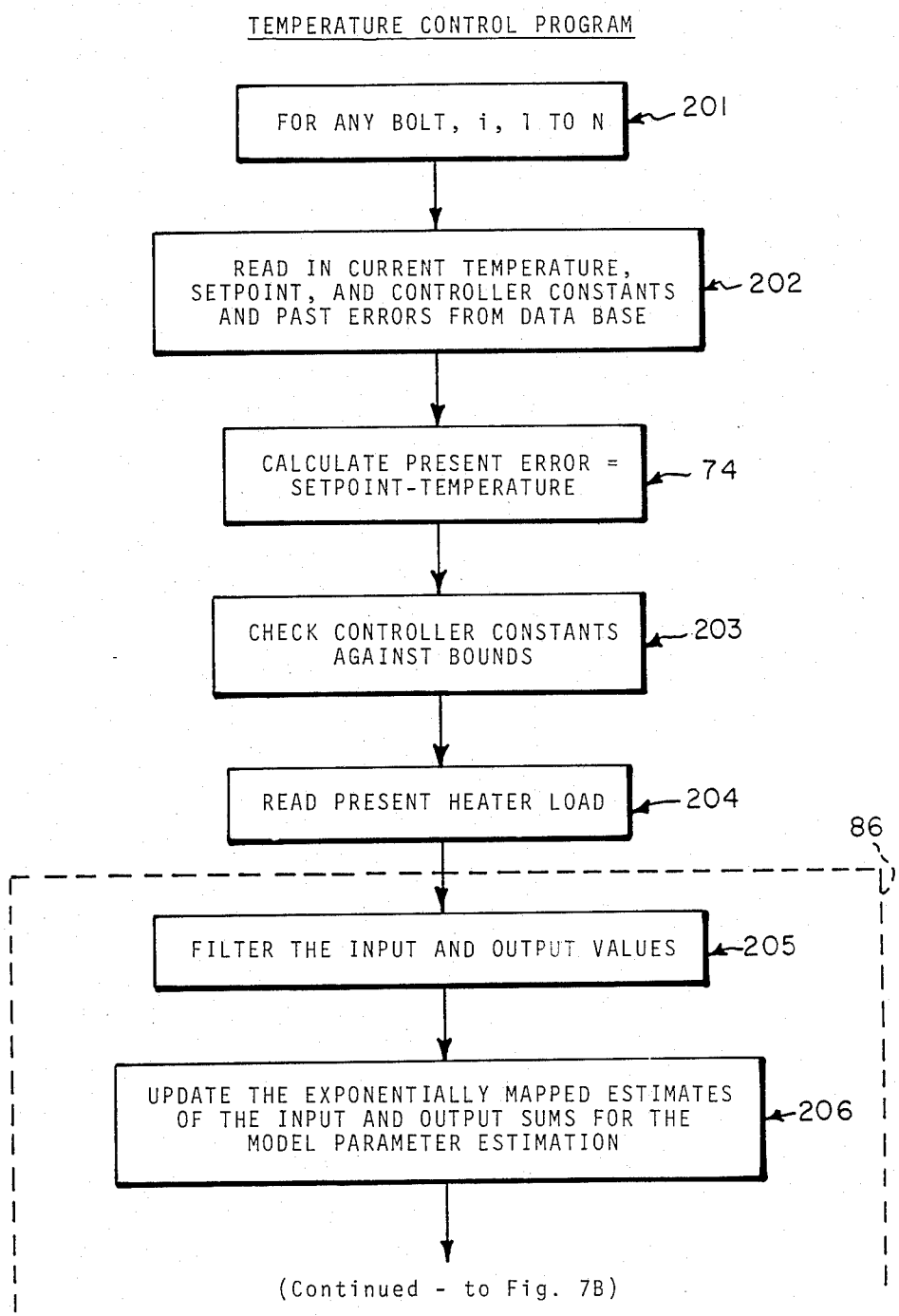

The physical process by which each heat responsive element 36 associated with each lane 32 is heated (e.g., by the passage of current) is indicated by the functional block 71. The temperature of each element 36 is monitored by its associated thermocouple 46 and is applied over the appropriate line 48 to a junction 74. The information on the line 76 represents the difference, or error, of the temperature set point and the measured temperature and is applied to a temperature control algorithm indicated by the functional block 78. The temperature control algorithm is implemented by the program shown in flow diagram form in FIGS. 7A and 7B. The output of the temperature control algorithm 78 is applied as a switch control signal output from a duty cycle controller indicated by the functional block 80 to the relay 44. The proportion of a predetermined time window (e.g., 1.666 seconds) that the switch control signal on the line 58 is in a selected state represents the duty cycle of a heater, i.e., the percentage of the predetermined time window in which the heater is asserted. Any suitable heater time window duration may be used.

The thickness measurement which serves as the basis of the temperature set point as described above is made at a predetemrined thickness sample rate on the order of fifty seconds (although any suitable thickness sample rate may be used). However, temperature control is effected by the nested inner temperature control loop 62 at an increased temperature sample rate, on the order of seven seconds (although any other suitable rate may be used) thereby providing the system 12 with the ability to more quickly and efficiently bring the temperature of the element 36 to a desired level and maintain it at that level. It is in this manner that the thickness of the extruded film 26 is maintained at a predetermined uniform dimension.

Figure 7B:
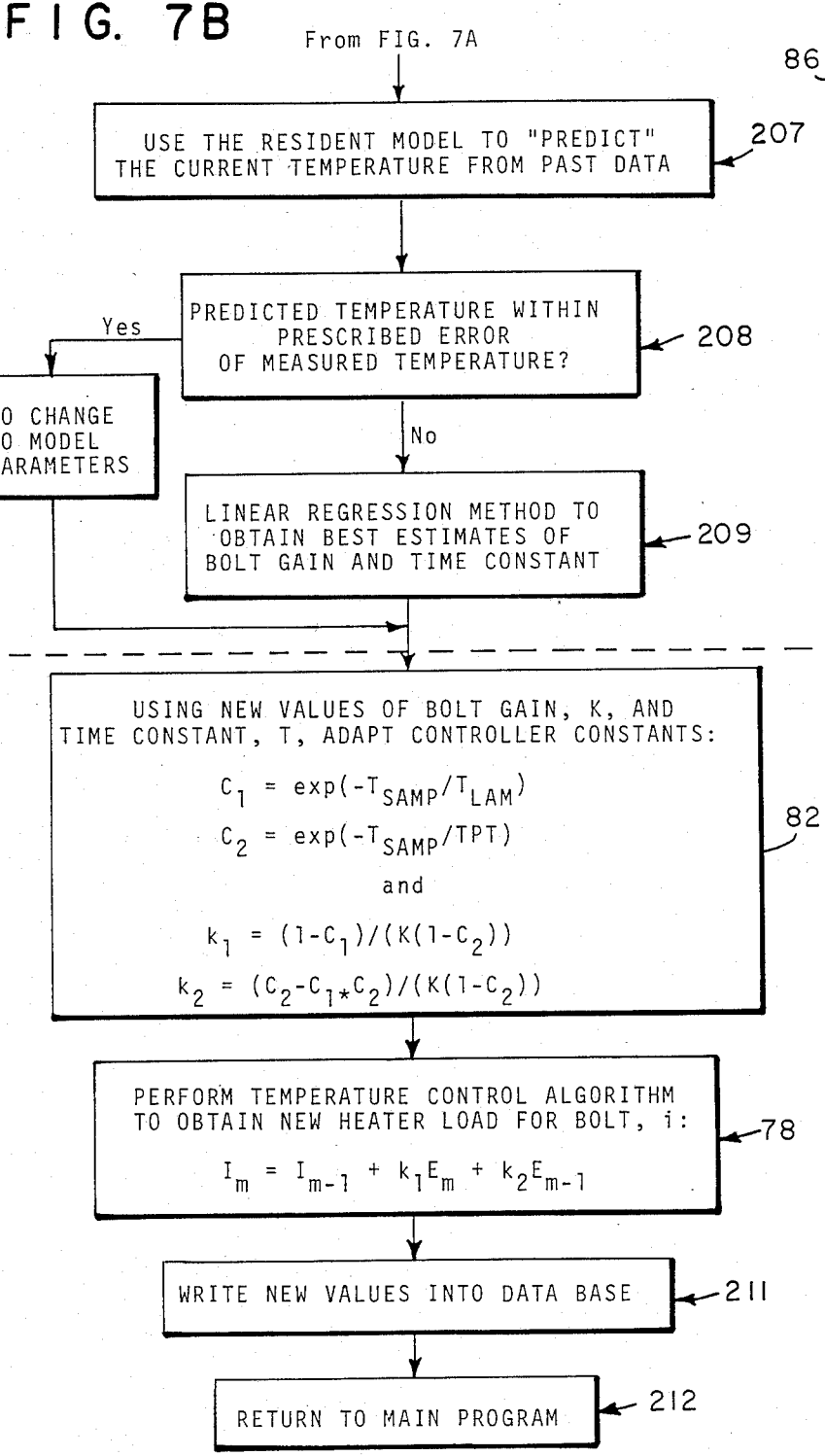

The inner temperature control loop 62 includes a control parameter adapter algorithm indicated by the functional block 82 (implemented by the program disclosed in flow diagram disclosed in FIG. 7B) implemented in an on-line process identification technique. The actual temperature of a given bolt 36 is applied over a line 48' from the thermocouple 46 and is applied along with the duty cycle signal on the line 58 to a model parameter estimator indicated by the functional block 86. The estimated model parameters calculated in the functional block 86 are applied over the line 88 to the control parameter adapter algorithm represented by the functional block 82. The functional blocks 82 and 86 function, in combination, to provide an adaptive temperature control arrangement. As a result control parameters are output on the line 90 to the temperature control algorithm indicated by the functional block 78. A functional block 78 operates on the temperature error signal on the line 76 to adjust the analog signal applied to the duty cycle controller 80 and thereby to the relay associated with the bolt to adjust the duty cycle in a manner which acts to eliminate the temperature error associated with that bolt. Typically the operation of the inner loop 62 results in a duty cycle modification once every seven seconds. Of course any other predetermined rate may be selected. It is noted that because of the adaptive nature of the algorithm decoupling of the output of the thickness controller 70A through 70N is not needed.

As best seen in FIG. 4 the thickness control system 12 is physically implemented in the preferred embodiment using a distributed processing network comprising a host computer 92 connected with a microprocessor based relay controller 94. The controller 94 includes a primary microcomputer 96 and an auxiliary microcomputer 98. Suitable for use as the host 92 is a Hewlett-Packard HP-1000L minicomputer. The primary microcomputer 96 and the auxiliary microcomputer 98 are implemented using an Intel 8748 single chip microcomputer. Of course, any suitable components may be used to implement the network 12 and remain within the contemplation of the present invention.

The host 92 communicates with the controller 94 over a data link 100 connected directly to the primary microcomputer 96. The primary microcomputer 96 is connected to the auxiliary microcomputer 98 over a data link 101 and a control link 102. Each of the microcomputers 96, 98 is respectively connected to a data switch 104 via a data link 105 or 106. The switch 104 is asserted in accordance with the state of a data control line 108 to apply the switch control signal representative of a heater duty cycle on either the lines 105 or 106 to the solid state relay 44 associated with that heater. The state of the line 108 is determined by monitoring the data line 100 from the host 92 to the primary microcomputer 96. For example, if the primary microcomputer 96 is receiving data from the host 92 the switch 104 is closed by the signal on the line 108 to connect the lines 105 and 58. Otherwise the switch 104 is controlled to connect the lines 106 and 58 when data transmissions are not received by the primary microcomputer 96 from the host 92.

The host 92 interfaces with the thermocouples 46A through 46N through an interface 110 via a bus 112. The thickness gauge 50 is connected through a buffer 114 and a bus 116 to the host 92.

The operation of the thickness control system 12 in accordance with the present invention may be understood from the overall system timing and data flow diagram shown in FIGS. 5A and 5B. The discussion is set forth in terms of a twenty-four channel apparatus (N equal twenty four) and timing is defined in terms of clock intervals (BCLOK) defined by the master clock of the host 92.

After an initialization sequence as indicated by the computational block 120 the control program is initiated by an output from a schedule control computational block 122 under control of the operating system time list 124. During the first computational block 126 defined by the host clock intervals one to twenty-seven (BCLOK=1 to 27) the host 92 interrogates the outputs of the thermocouples 46 as applied through the interface buffer 110. The host uses this information of the monitored temperatures to derive the value of the corresponding actual temperatures of each of the expansion bolts 36.

The next program sequence indicated by the computational block 128 implements the temperature control function indicated schematically in the functional block 78 to derive an updated heater control signal. This computation is based upon the temperature set points prescribed as a result of the last-preceding thickness monitoring and the current value of the measured temperature control algorithm indicated by the functional block 78, using updated control parameters 90 derived from the adaptive algorithm represented by the functional block 82. The flow diagram of the temperature control program (including the adaptive algorithm 82) is set forth in FIGS. 7A and 7B.

During the computational block 130 defined by the host time interval corresponding to BCLOK=52 the host 92 checks the interface 114 to ascertain if an updating of the thickness measurement has occurred. If not, host computational activity is suspended until time interval corresponding to BCLOK=78 shown in the computational block 132. At this time (BCLOK=78) the updated heater control outputs computed during the computational block 128 are applied to the relay controller 94 which applies the updated heater duty cycle signal on the line 58 to the relay 44 of the particular bolt 36. The updating action of the temperature control loop 62 as described in connection with functional blocks 78, 80, 82 and 86 (FIG. 3) as implemented during computational blocks 126 and 128 (FIG. 5A) occurs at a repetition rate faster than the thickness computation rate to be described. Preferably the inner temperature control loop 62 is executed approximately once every seven seconds.

If the thickness monitoring has occurred when queried in the computational block 130 the host retrieves this information. The raw information, which contains data for all N lanes, is used to compute corresponding film thickness for all lanes.

The computational block 134 is defined in host time interval corresponding to BCLOK=53 to 77 implements the thickness control depicted in the functional block 70 and computes a new temperature set point (the signal on the line 72) for each lane. The flow diagram of this program is set forth in FIGS. 6A and 6B. The new temperature set point derives as described is used during each succeeding temperature control loop (computational blocks 126 and 128) that occurs intermediate successive thickness monitorings. The thickness control loop 60 corresponding to the computational blocks 130 and 134 occurs once every fifty seconds in the preferred case.

Figure 6A:
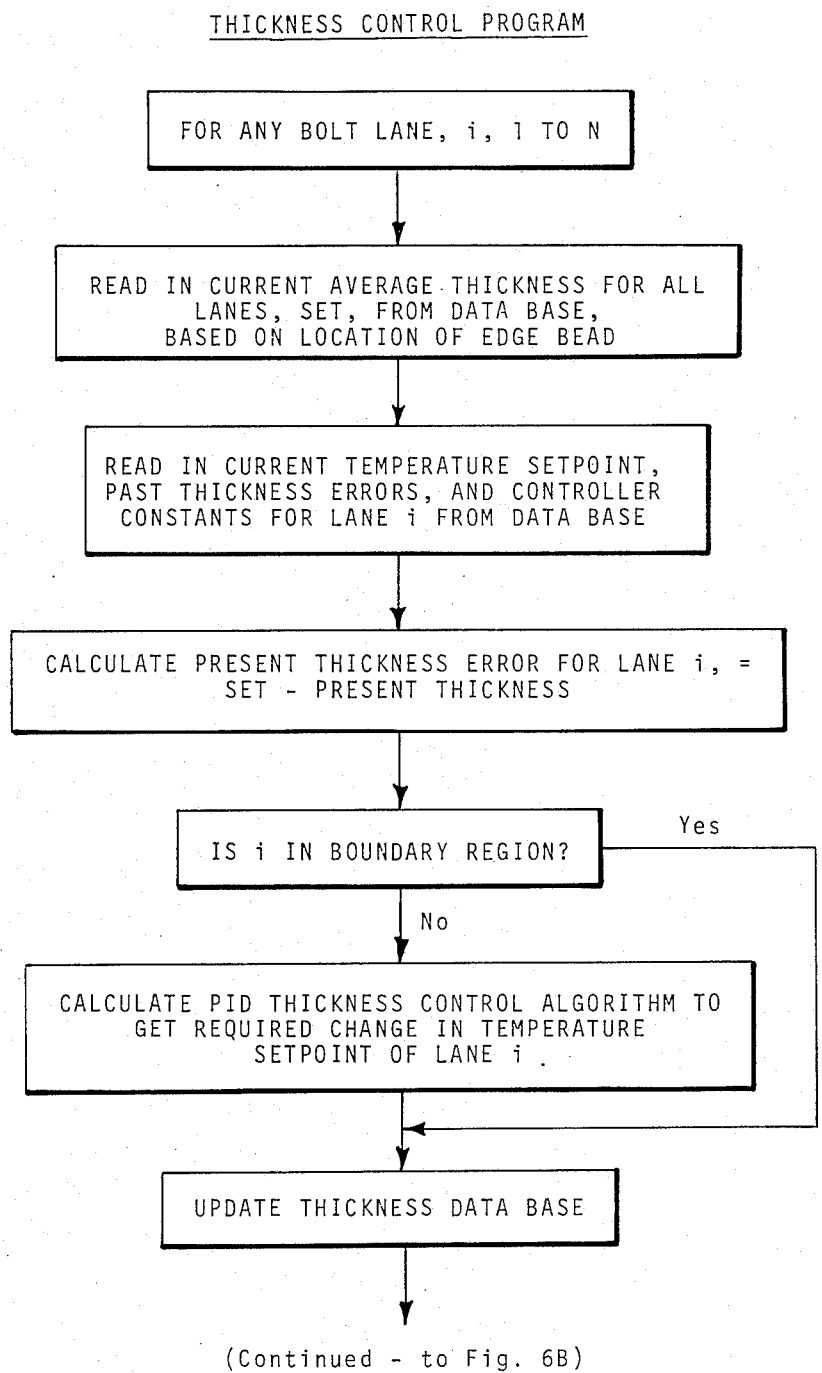
FIGS. 6A, 6B and 7A, 7B are respectively flow diagrams of the programs implementing thickness control algorithm and the temperature control algorithm (including the adaptive algorithm) used in the control system of the present invention.
Figure 6B:
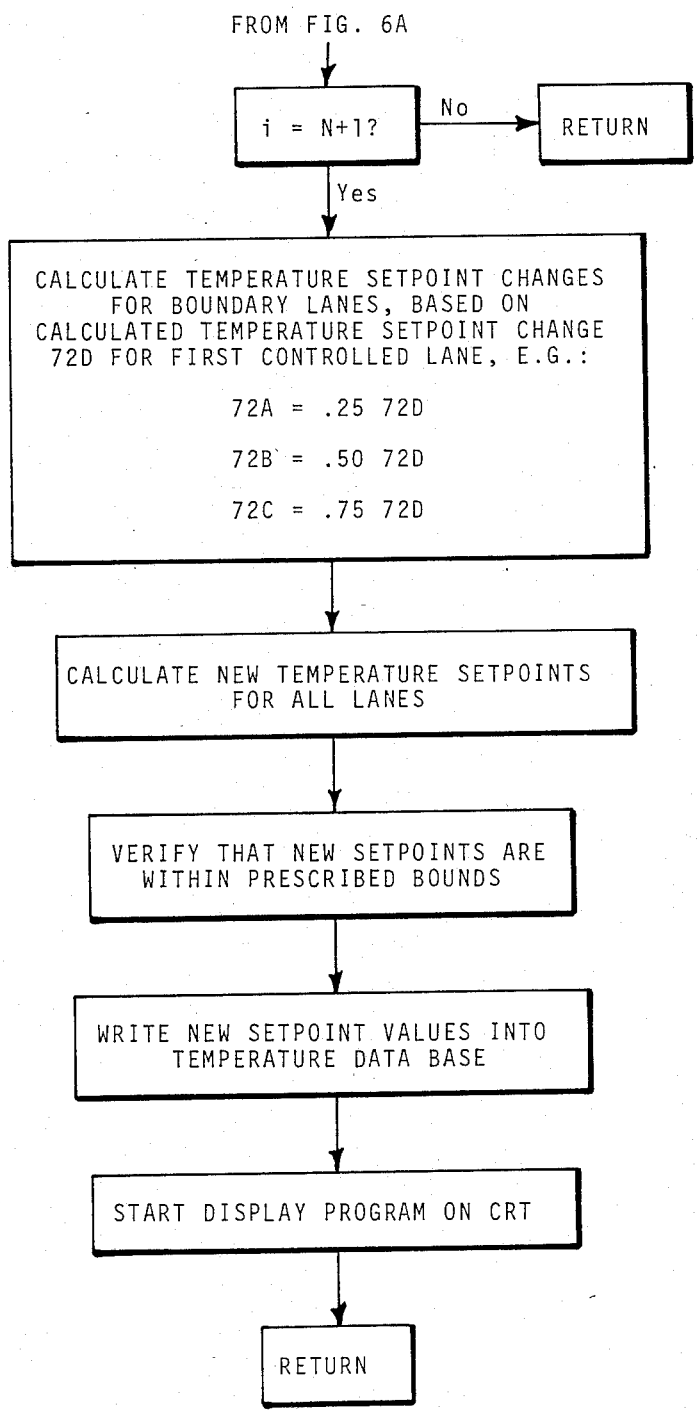

With particular reference to the thickness control program shown in FIGS. 6A and 6B as executed during the computational block 130 (FIG. 5A) to implement the functional block 78 (FIG. 3) it is noted that the updated heater set points for the heating elements within a predetermined range of contiguity of the lateral edges of the film 26 are determined based upon the thickness of the extrudate at a predetermined one of the inner lanes. For example, the temperature set points 72A, 72B, 72C respectively developed for the heat responsive elements associated with the lanes 32A, 32B and 32C may be based upon the thickness of the extrudate monitored for the lane 32D. Similarly, the temperature set points for the heaters associated with the lanes 32N, 32(N−1) and 32(N−2) are derived from the thickness of the extrudate monitored in the lane 32(N−3). As a result the control of the thickness of the extrudate in the lanes contiguous to the lateral edges of the film 26 is improved, thereby reducing the wastage present in the edge portions 27 of the film. It is noted that temperature control (once a temperature set point is derived) loop is the same for all heaters. But the temperature set point for the laterally outer lanes derived from the thickness of the extrudate in a predetermined inner lane. The program which implements this function is set forth in the Appendix.

Figure 8A:
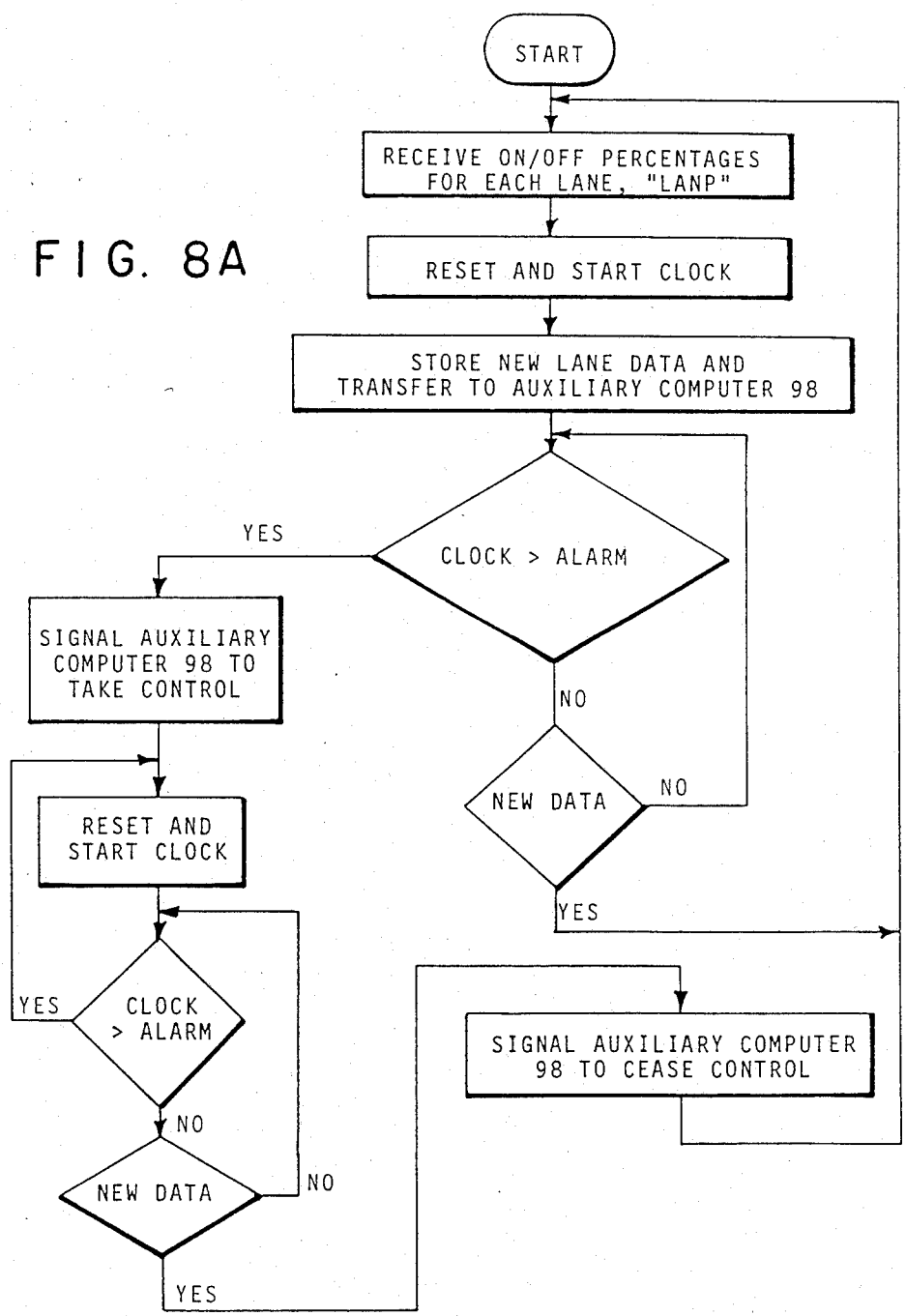
FIGS. 8A, 8B, 9 and 10 are, respectively, a flow diagram for the primary microcomputer program, a flow diagram for the program that generates a historical trend of previous heater duty cycle control signals, and a flow diagram for the auxiliary microcomputer heater control program.
Figure 8B:
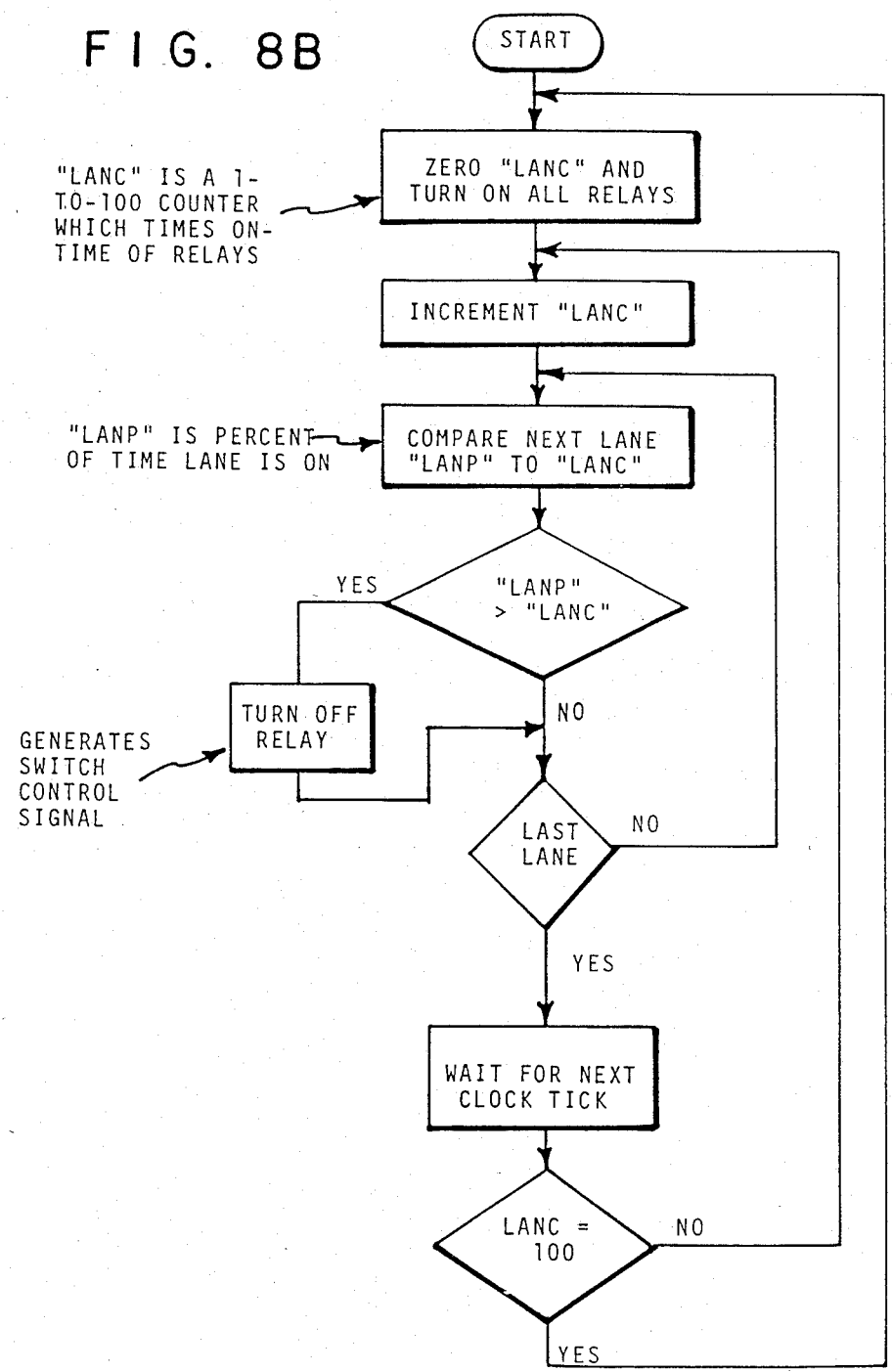

Once the appropriate heater duty cycle for each heat responsive element is applied to the controller 94 for that element the actual control of the heater is implemented by the primary microcomputer 96 over the line 105 connected through the switch 104. The microcomputer 96 controls each of the heaters 40 by regulating the duty cycle of the relays 44 which closes the circuit including that heating element for a predetermined duration of a predetermined time window. For example, a typical time window has a duration of 1.666 seconds. Using conventional power control circuitry this window affords one hundred opportunities at which current to the heater 40 may be interdicted. Thus, by controlling the point at which the power to the heater 40 is interrupted by opening of the relay 44, the duty cycle of the heater 40 is controlled. The primary microcomputer 96 also performs a "watch dog" function (shown in FIG. 8A) in that it monitors the data line 100 from the host 96 to verify that the host is transmitting data to the primary microcomputer 96. The heater control program executed by the primary microcomputer 100 is set forth in FIG. 8B.

Figure 9:
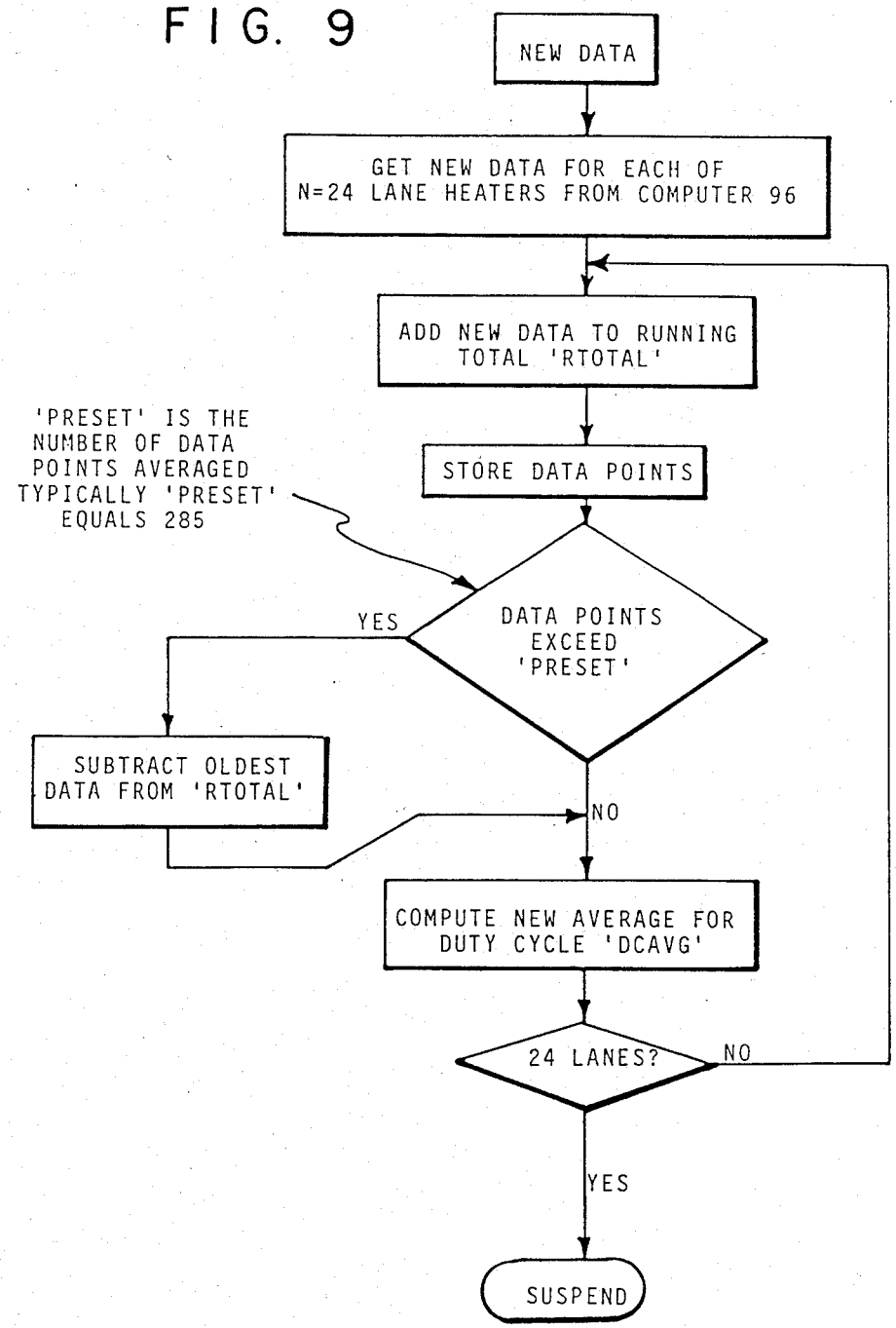

In addition, the primary microcomputer 96 is associated with the auxiliary microcomputer 98. The auxiliary microcomputer 98 serves to generate and to store a continuously updated duty cycle control signal for each heater based upon a predetermined number of preceding duty cycle values. In the event of the loss of host control (as evidenced by the failure of the primary microcomputer 96 to receive data over the link 100) the switch 104 switches and a duty cycle set point based upon the stored historical trend of duty cycle values is applied over the line 106 from the auxiliary microcomputer 98 to the line 58 and this signal is used to control the heat responsive elements. Each time data is passed from the host computer 92 (every seven seconds) the data in turn is passed over the link 101 to the auxiliary computer 98. These data are averaged over a predetermined time, approximately two hundred eighty five samples which covers the period of about forty-five minutes for each lane. This time is arbitrarily selected to provide a reasonable history of the duty cycle trend. Before all of the predetermined number of samples are achieved the data is added and a new average is calculated. After the predetermined number of samples the newest data is added and the oldest data are removed from the total such that the results is the average of only the latest predetermined number of samples. The program for this function of the auxiliary microcomputer 98 is shown in FIG. 9.

Figure 10:
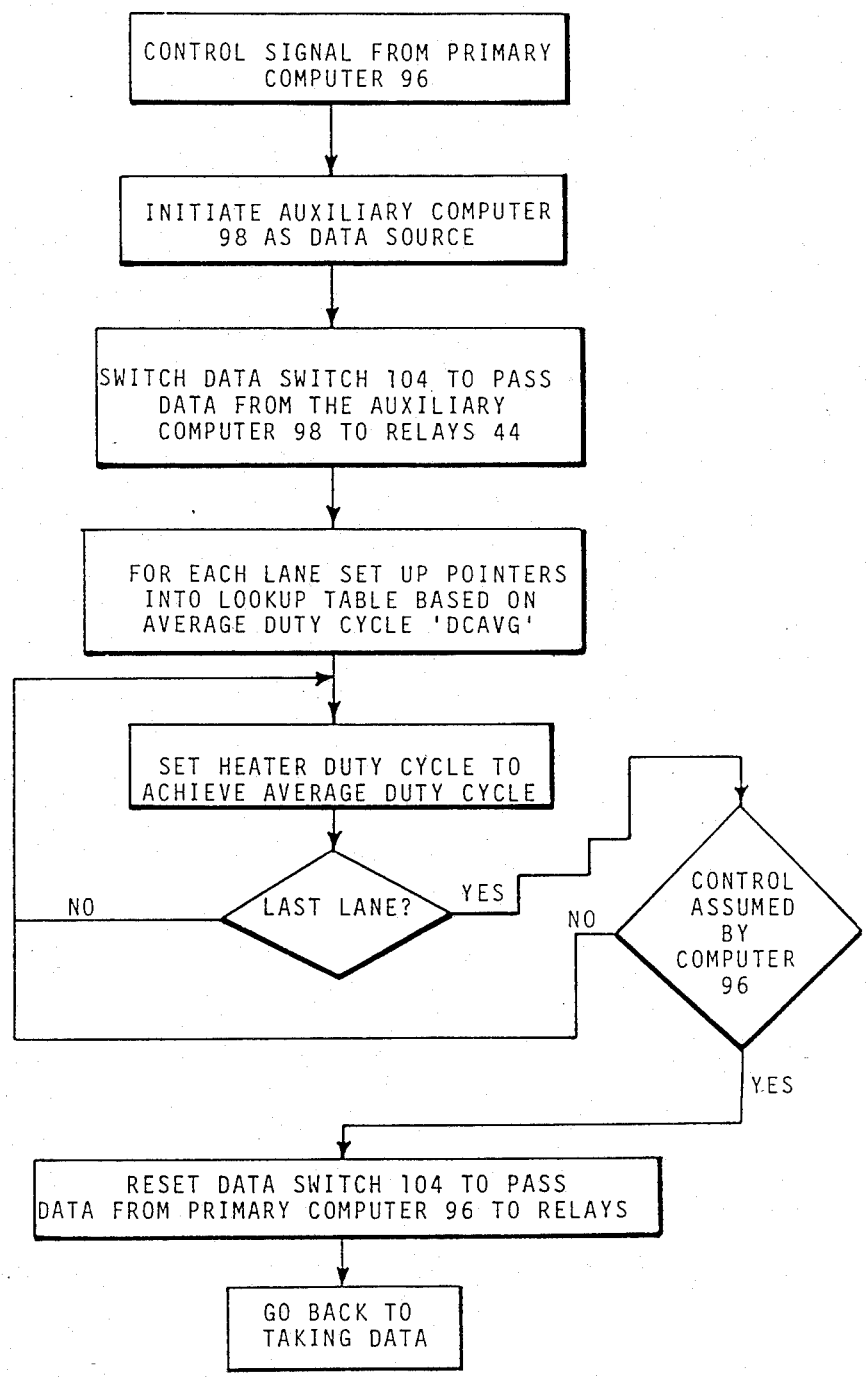

As seen from the program illustrated in flow diagram form in FIG. 10 at the time the primary microcomputer 96 determines by way of its "watch-dog" function that data are no longer being provided by the host computer 92 a control signal is passed over the line 102 to the auxiliary microcomputer 98 to take over the control function based on the previously computed and stored historical trend of the duty cycle. The auxiliary microcomputer executes a routine which permits the duty cycle of the heaters to approximate as closely as possible the historical duty cycle value. The limitation imposed by the existence of discrete switching points may render impractical a duty cycle value somewhere intermediate discrete points. So, the auxiliary microcomputer operates the heaters in such a manner that after a predetermined number of time windows has elapsed, the weighted sum of the duty cycles imposed during each window results in a duty cycle much closer to the accumulated duty cycle value. As a result when the host operability is restored the correction to the duty cycle set point needed to compensate for the period of host inoperability is minimized. This function of the auxiliary microcomputer 98 is shown in FIG. 10.

Two periods of different lengths are used by the auxiliary microcomputer 98 to control the average temperature of the die bolts. The first period, referred to as division one, consists of one hundred cycles of the sixty cycle line frequency. The second, referred to as division two, consists of one hundred cycles of division one. Division one lasts 1.666 seconds and division two lasts for (100×1.666) or 2.78 minutes. This time is selected as a compromise between the ability to achieve good resolution, one part in ten thousand, and the thermal time constant of the die bolts which is approximately fifteen minutes. The percentage time of each division is determined as in the following example.

EXAMPLE

Duty cycle average to be duplicated—DCAVG=55.35%

| | | |
|---|---|---|
| Division 2 | 65% | 35% |
| Division 1 (ON/OFF) | 55/45 | 56/44 |

Further, if division two percentages were even (divisible by two), then they would be reduced to the next smallest fraction. For instance, if the percentage of time that the 55/45 ratio to be held was 64 instead of 65 then the percentages would be changed to 32% for the 55/45 ratio and 16% for the 56/44 ratio which would be an equivalent average time but has the advantage of less temperature "ripple".

At the time the auxiliary duty cycle control computer is signaled that it must provide the control, a table is set up for each lane based on the averages that must be maintained. Once the table has been established, address pointers into the table are used by the computer to determine the on-off control sequence for the solid state relay for each heater.

The Appendix, which forms a part of this specification, contains listings of the programs described in the FIGS. 6 and 7. The programs are set forth in the Fortran language and are keyed to the functional or computational blocks indicated in those FIGURES. The Appendix appears immediately preceding the claims.

Those skilled in the art, having the benefit of the teachings of the present invention as set forth herein may effect numerous modifications thereto. Such modifications are to be construed as lying within the scope of the present invention as defined by the appended claims.

APPENDIX

LISTINGS

0001    :RP,LFE

0002    :RP,FILMC

0003    :RP,TSET

0004    :RP,PARDM

```
0001  FTN4,L
0002  C
0003
0004          PROGRAM LFE
0005  C
0006  C ***************************************************************
0007  C  *
0008  C  *     Program gets serial data from the LFE and transfers it
0009  C  *     to the main program using using class calls.  The class
0010  C  *     is obtained by the main program and passes it to this
0011  C  *     program when it initially schedules this program.
0012  C  *
0013  C  *     The data from the LFE is in the following format:
0014  C  *
0015  C  *        43B 4=xxx.xxx0@@ @@ @@ ---------------@@4*
0016  C  *
0017  C  *     where xxx.xxx is ASCII representing the average
0018  C  *     thickness,@@ are two 7 bit data fields:
0019  C  *
0020  C  *     100aaaa 100bbbb where aaaabbbb are a 8 bit twos
0021  C  *     compliment number representing the + and - deviation
0022  C  *     from the average.
0023  C  *
0024  C  *     The data is transferred in floating point format
0025  C  *     with the first word representing the average and
0026  C  *     the remaining words (~96) representing the deviation
0027  C  *     from the average.
0028  C  *
0029  C  *
0030  C ***************************************************************
0031  C
0032          INTEGER ICLAS,LU,IDUM1,IDUM2,IDUM3,IDUM4,ICNWD,LEN,IB,IA
0033          INTEGER IOP1,IOP2,PARM(5),BUFFER(300),CNWD,DATLEN,IBUF(300)
0034          INTEGER STBUF(300),INAM(3)
0035          INTEGER TEMP,TEMP1,IDATA,SIGN,IX,SCANFL
0036          REAL DATA(300),X,CALFAC,DIES
0037          EQUIVALENCE(DATA,IBUF)
0038          DATA INAM/2HDS,2HTO,2HR /
0039          ICNWD=26                  !SERIAL CARD LU
0040
0041          ICTR=1
```

```
0042          CNWD=100B                  !INDICATES BINARY DATA
0043          IOP1=0
0044          IOP2=0
0045          SCANFL=1
0046    C
0047    C   GET CLASS NUMBER (ICLAS) FROM CALLING PROGRAM
0048
0049    C
0050          CALL RMPAR(PARM)
0051          ICLAS=PARM(1)
0052    C
0053    C   GET DATA FROM LFE DEVICE THROUGH SERIAL CARD (LU 13)
0054    C
0055          WRITE(1,11)
0056     11   FORMAT("ENTER VALUE FOR DIES")
0057          READ(1,12)DIES
0058     12   FORMAT(F3.2)
0059          CALFAC=DIES/128
0060          WRITE(1,10)
0061    C
0062     10   FORMAT("ENTER NUMBER OF CHARACTERS TO CAPTURE")
0063          READ(1,20)LEN
0064          IF (LEN.LT.0) GOTO 400
0065     20   FORMAT(I3)
0066      5   LEN=-LEN
0067          CALL EXEC(1,ICNWD,BUFFER,LEN)
0068    C
0069          LEN=ABS(LEN)
0070          IF (SCANFL.EQ.0)THEN
0071             SCANFL=1
0072             GOTO 5
0073          ELSE
0074             SCANFL=0
0075          ENDIF
0076    C
0077    C   UNPACK DATA
0078    C
0079          DO 100 K=1,LEN
0080             TEMP=BUFFER(K)
0081             TEMP1=TEMP/256
0082             TEMP=IAND(TEMP,377B)
0083             I=2*K-1
0084             STBUF(I) =TEMP1
0085             STBUF(I+1)=TEMP
0086    100   CONTINUE
0087    C
0088    C   CONVERT DATA TO BINARY FORMAT
0089    C
0090    C   CONVERT ASCII AVERAGE TO REAL NUMBER
0091    C
0092    C   FIND DECIMAL POINT
0093    C
0094          KCTR=0
0095          DO 30 K=1,20
0096             KCTR=KCTR+1
0097             IF (STBUF(K).EQ.56B)THEN
0098                ISP=KCTR-1                !SET STARTING POINT
0099                GOTO 31
0100             ELSE
0101                IF(KCTR.EQ.20)THEN
0102                   WRITE(1,32)(STBUF(KK),KK=1,20)
0103     32            FORMAT("DATA OUT OF RANGE",20A2)
0104                   SCANFL=1
0105                   GOTO 5
0106                ENDIF
0107             ENDIF
```

```
0108  30      CONTINUE
0109  C    NOW CONVERT
0110  C
0111  31      IX=STBUF(ISP)-60B
0112          X=FLOAT(IX)
0113          DATA(1)=X
0114          IF (DATA(1).LT.0) THEN
0115             DATA(1)=0
0116          ENDIF
0117          IX=STBUF(ISP+2)-60B
0118          X=FLOAT(IX)
0119          DATA(1)=X/10+DATA(1)
0120          IX=STBUF(ISP+3)-60B
0121          X=FLOAT(IX)
0122          DATA(1)=DATA(1)+X/100
0123          IX=STBUF(ISP+4)-60B
0124          X=FLOAT(IX)
0125          DATA(1)=DATA(1)+X/1000
0126  C
0127  C    TEST FOR OUT OF RANGE
0128  C
0129          IF(DATA(1).LE.0.OR.DATA(1).GT.10)THEN
0130             WRITE(1,33)DATA(1)
0131  33       FORMAT("LAST DATA FOR LFE WAS OUT OF LIMITS - AVG= ",F6.3)
0132             WRITE(1,35)(STBUF(KK),KK=1,10)
0133             WRITE(1,34)(BUFFER(KK),KK=1,5)
0134  34       FORMAT("BUFFER=",5A2)
0135  35       FORMAT("STBUF=",10A2)
0136             SCANFL=1
0137             GOTO 5
0138          ENDIF
0139  C
0140  C    ASSEMBLE PROFILE DATA FROM CODED FORMAT
0141  C
0142          I=2
0143          DO 500 K=ISP+6,LEN,2
0144             TEMP=STBUF(K)
0145             TEMP=TEMP*16                    !MOVE 4 BITS LEFT
0146             TEMP1=IAND(STBUF(K+1),17B)      !MASK NEXT WORD FOR RIGHT 4 BITS
0147             IDATA=IAND(TEMP+TEMP1,377B)     !ADD AND MASK OUT HI BYTE
0148             SIGN=IAND(IDATA,200B)           !TEST BIT 9 FOR SIGN
0149             IF (SIGN.NE.0) THEN
0150                IDATA=IDATA+177400B          !IF LO BYTE (-) MAKE WORD (-)
0151             ENDIF
0152             DATA(I)=FLOAT(IDATA)
0153             DATA(I)=DATA(I)*CALFAC
0154             I=I+1
0155  500     CONTINUE
0156          DATLEN=(I-1)
0157  C    TRANSFER DATA TO MAIN PROGRAM
0158  C
0159  C
0160          DATLEN=DATLEN*2
0161          CALL EXEC(20,0,IBUF,DATLEN,IOP1,IOP2,ICLAS)
0162          ICTR=ICTR+1
0163          WRITE(1,333)ICTR,(STBUF(KK),KK=1,10)
0164          WRITE(1,334)ICTR,(BUFFER(KK),KK=1,5)
0165  333     FORMAT("LFE TRANSFER ",I5,2X,10A2)
0166  334     FORMAT("LFE TRANSFER ",I5,2X,5A2)
0167  C
0168  C    CALL PROGRAM TO STORE DATA
0169  C
0170          CALL EXEC(10,INAM,IDUM1,IDUM2,IDUM3,IDUM4,IDUM5,IBUF,DATLEN)
0171          GOTO 5
0172      400 END
```

LODA

```
0001   SN,SNAP::-16
0002   LCOM
0003   SCOM
0004   LIB,$F4XLB
0005   LIB,$HPIB
0006   OUTPUT,FILMC::-17
0007   -SZ,25
0008   REL,%FILMC
0009   REL,%TSCN1
0010   REL,%TSCN2
0011   REL,%TSCN3
0012   REL,%TSCN4
0013   REL,%TSCN5
0014   REL,%BOLTP
0015   REL,%FLOOP
0016   REL,%THKLO
0017   REL,%GJR
0018   REL,%RDVAL
0019   REL,%DARED
0020   REL,%WRVAL
0021   END

0001   FTN4,L
0002   C
0003         PROGRAM FILMC
0004   C
0005   C ***************************************************************
0006   C *
0007   C *   This is the main program for control of extrusion coating
0008   C *   using a 24 lane EDI flexible lip die. This program is
0009   C *   scheduled periodically by the computer operating system with
0010   C *   a period (usually 50 milliseconds) determined interactively
0011   C *   by the operator. Each time the program is scheduled it
0012   C *   performs different measurement and control tasks by calling
0013   C *   other program modules. The value of BCLOK which ranges
0014   C *   between 0 and 78 determines what tasks are to be called.
0015   C *
0016   C *   The first time FILMC is scheduled it in turn schedules the
0017   C *   program HP16. HP16 acquires and decodes the thickness data
0018   C *   for the HP16 gage and places the results in a system buffer
0019   C *   for use by the FILMC program.
0020   C *
0021   C *   When BCLOK is 1 to 27 subprograms TSCA1, TSCA2, TSCA3, TSCA4
0022   C *   and TSCA5 are called to acquire and calculate 24 different
0023   C *   temperatures from the 24 die bolts.
0024   C *
```

```
0025  C *    When BCLOK is 28 to 51 the subprogram FLOOP is called to
   *
0026  C *    to update the temperature loop model and calculate the on
   *
0027  C *    time for the heaters.
   *
0028  C *
   *
0029  C *    When BCLOK is 52 the subprogram DARED is called to retrieve
   *
0030  C *    the thickness data from system storage and calculate the 24
   *
0031  C *    lane thicknesses.
   *
0032  C *
   *
0033  C *    When BCLOK is 53 to 77 the subprogram THKLP updates the
   *
0034  C *    system model and calculates new temperature set points.
   *
0035  C *
   *
0036  C *    When BCLOK is 78 it is reset to 0 and BOLTP is called to
   *
0037  C *    to output data to the microcomputer for new time heater
   *
0038  C *    time proportioned heater outputs.
   *
0039  C *
   *
0040  C *
   *
0041  C *
   *
0042  C ****************************************************************
   *
0043  C
0044        COMMON REFSIG,PLTTEM,CTR,DCPON,SCANNO,IFLFL,MODE
0045        COMMON          G(24),U(24),THDIFT,PAR1,ADAPT,LANEST
0046        DIMENSION TK(24,2),TG(24,2),DC(24,24),A(24,3,3),C(24,3)
0047        INTEGER BCLOK,CCLOK,CTR,FIRPA,FIRSC,DATRDY,REFSIG,RESET,DCPO
    N
0048        INTEGER ICLAS,IA,IB,LENBUF,INAME(3),CLASS,CNWD,IBUF(300)
0049        INTEGER TPCNT,DBPON,K,BUFR(24),SCANFL,ITIME(5),TIMDIF
0050        REAL BUFF(150)
0051        EQUIVALENCE(BUFF,IBUF)
0052        EXTERNAL TPCNT
0053        DATA INAME/'HP16   '/
0054  C
0055  C     SCHEDULE BOLT PROPORTIONER EACH 77 TRIPS THROUGH THIS ROUTINE
0056  C
0057  C
0058        ICOMP=7400B+15B
0059  C
0060  C     SET PRINTER ON 6 TO 132 COLUMNS
0061        WRITE(6,897)ICOMP
0062  897   FORMAT(2A)
0063  C
0064        BCLOK=0
0065        CLASS=0
0066        SCANNO=0
0067        IFLAG=0
0068        CNWD=100B
0069        LENBUF=300
0070        SCANFL=0
0071        IFLAG=0
0072        CTR=0
```

```
0073            WRITE(1,92)
0074    92      FORMAT(' CONTROL MODE:   TEMP ONLY (0) OR THICK CASCADE (1)?'
)
0075            READ(1,98)MODE
0076    98      FORMAT(I1)
0077            IF(MODE .EQ. 0)GOTO 20
0078            WRITE(1,101)
0079    101     FORMAT(' DECOUPLER ON (1) OR OFF (2)?')
0080            READ(1,102)DCPON
0081    102     FORMAT(I1)
0082            WRITE(1,103)
0083    103     FORMAT(' ADAPTIVE THICKNESS CONTROLLER ON (1) OR OFF (2)?')
0084            READ(1,102)ADAPT
0085            WRITE(1,143)
0086    143     FORMAT(' NO. OF LANES ON EACH SIDE NOT IN CONTROL (Default=3
)?')
0087            READ(1,102)LANEST
0088            IF(LANEST .LT. 1 .OR. LANEST .GT. 3)LANEST=3
0089    20      WRITE(1,110)
0090    110     FORMAT("ENTER STANDBY POWER (%) FOR DIE BOLT HEATERS")
0091    140     READ (1,120)DBPON
0092    120     FORMAT(I3)
0093            IF (DBPON.LE.0) THEN
0094               GOTO 5
0095            ELSE
0096               IF (DBPON.GT.99) THEN
0097                  GOTO 20
0098               ELSE
0099                  DO 40 K=1,24
0100                  BUFR(K)=DBPON+256*K
0101    40            CONTINUE
0102                  CALL WRVAL(TPCNT,BUFR)
0103                  CALL BOLTP
0104               ENDIF
0105            ENDIF
0106            WRITE (1,130)DBPON
0107    130     FORMAT("OPERATING AT ",I2,"%. PRESS CR TO CONT OR ENTER NEW
%")
0108            GOTO 140
0109    C
0110    C     GET CLASS NUMBER
0111    C
0112    5       CALL EXEC(20,CNWD,IBUF,LENBUF,IDUM3,IDUM4,CLASS)
0113    C
0114    C     CONSUME CLASS NUMBER
0115    C
0116            CALL EXEC(21,CLASS+120000B,IBUF,LENBUF)
0117            ICLAS=CLASS+120000B !SET NO WAIT BIT AND SAVE CLASS NUMBER B
IT
0118    C
0119    C     SCHEDULE HP16 DATA ACQUISITION PROGRAM AND PASS CLASS NUMBER
0120    C
0121            CALL EXEC(10,INAME,CLASS)
0122    C
0123    C
0124    C     BEGINNING OF CONTROL OPERATION
0125    C
0126    C
0127    10      CONTINUE
0128    C
0129    C     GET AND PRINT OUT TIME
0130    C
0131    C     UPDATE BCLOK
0132    C
0133            IF(BCLOK .GT. 77) THEN
0134               BCLOK=0
0135            ELSE
0136               BCLOK=BCLOK+1
0137            ENDIF
```

```
0138          IF(BCLOK .EQ. 0) THEN
0139             CALL BOLTP
0140          ENDIF
0141 C
0142 C
0143 C    SCHEDULE TEMPERATURE SCAN 1 TIME TO GET REFERENCE CALIBRATION
0144 C
0145          IF (BCLOK.EQ.1) THEN
0146             CALL TSCA1
0147          ENDIF
0148 C
0149 C  SCHEDULE TEMPERATURE SCAN 1 TIME TO GET REFERENCE TEMPERATURE
0150 C
0151          IF (BCLOK.EQ.2) THEN
0152             CALL TSCA2
0153          ENDIF
0154 C
0155 C  SCHEDULE SUBROUTINE TO COMPUTE REFERENCE TEMPERATURE
0156 C  AND INITIATE THE FIRST TEMPERATURE MEASUREMENT
0157 C
0158          IF (BCLOK.EQ.3) THEN
0159             CALL TSCA3
0160             CALL TSCA4
0161          ENDIF
0162 C
0163          IF (BCLOK.GE.4) THEN
0164             IF (BCLOK.LE.26) THEN
0165                CALL TSCA5
0166                CALL TSCA4
0167             ELSE
0168                IF (BCLOK.EQ.27) THEN
0169                   CALL TSCA5
0170                   CTR=0
0171                ENDIF
0172             ENDIF
0173          ENDIF
0174 C  SCHEDULE TEMPERATURE CONTROL LOOP 24 TIMES EACH OUT OF 77 TRIPS
0175 C  THROUGH THIS ROUTINE
0176          IF(BCLOK .GE. 28)THEN
0177             IF(BCLOK .LE. 51)THEN
0178             CCLOK=BCLOK-27
0179             CALL FLOOP(CCLOK,TK,TG,A,C)
0180             ENDIF
0181          ENDIF
0182 C
0183 C  GET THICKNESS MEASUREMENTS FROM LFE AND IF THERE IS DATA THEN
0184 C  SCHEDULE DARED THICKNESS DATA REDUCTION PROGRAM
0185 C
0186          IF(MODE .EQ. 0)GOTO 703
0187          IF (BCLOK.EQ.52)THEN
0188             CALL EXEC(21,ICLAS,IBUF,LENBUF)
0189             CALL ABREG(IA,IB)
0190             IF(IA.GE.0)THEN
0191                IF(BUFF(1) .LE. 0)GOTO 703
0192                CALL DARED(BUFF)
0193             ENDIF
0194          ENDIF
0195          IF (BCLOK.GE.53.AND.BCLOK.LE.77)THEN
0196             IF(BUFF(1) .LE. 0)GOTO 703
0197             IF(IA.GE.0)THEN
0198                LANE=BCLOK-52
0199                CALL THKLO(LANE,TK,TG,DC)
0200             ENDIF
0201          ENDIF
0202 C
```

```
0203  C  SUSPEND
0204  C
0205  703   CONTINUE
0206  C
0207        CALL EXEC(6,0,1)
0208        GOTO 10
0209        END

0001  FTN4,L
0002        SUBROUTINE TSCA1
0003  C
0004  C  ******************************************************************
0005  C  *
0006  C  *   Five subprograms are called by FILMC to get temperature
0007  C  *   data from the CPI interface. This subprogram initiates
0008  C  *   the acquisition of the calibratation voltage across
0009  C  *   a precision resistor. This voltage is used to
0010  C  *   calibrate the RTD output once at the beginning of the
0011  C  *   the acquisition of the 24 temperature measurements.
0012  C  *
0013  C  *   The command format control word REFBU1 selects card
0014  C  *   slot 3, enables interrupt, and selects random access
0015  C  *   mode. The data output format control word REFBU2
0016  C  *   sets the channel to 0 on the first gate card, and the
0017  C  *   full scale output to 102.4 mv. The data is acquired
0018  C  *   on the next cycle of FILMC by subprogram TSCA2.
0019  C  *
0020  C  ******************************************************************
0021  C
0022        INTEGER REFBU1,REFBU2
0023  C     SLOT3=3
0024  C     GAIN=3
0025  C     REFBU1=9*256+SLOT3
0026        REFBU1=2307
0027  C     REFBU2=GAIN-1
0028        REFBU2=2
0029  C
0030  C  Select card 3, enable interrupt, and select random access mode
0031  C
0032        CALL SECW(8,0,REFBU1,1)
0033  C
0034  C  Set gain to 102.4 millivolts on channel 0 of first gate card
0035  C
0036        CALL SECW(9,0,REFBU2,1)
0037        RETURN
0038        END
0039
```

```
0001  FTN4,L
0002        SUBROUTINE TSCA2
0003  C
0004  C     ******************************************************
0005  C     *
0006  C     *     Five subprograms are called by FILMC to get temperature
0007  C     *     data from the CPI interface.  This subprogram acquires
0008  C     *     the data for the calibration voltage initiated by
0009  C     *     the subprogram TSCA1 and initiates the acquisition of
0010  C     *     the temperature reference from the RTD.
0011  C     *
0012  C     *     The command format control word CTLWD selects card
                                    CN
0013  C     *     slot 3, disables interrupt, and selects random access
0014  C     *     mode. The data acquired from the card is placed in
0015  C     *     buffer word REFSIG. The card is set up for the next
0016  C     *     measurement by the command format control word REFBU1
0017  C     *     which selects card slot 3, enables interrupt, and
0018  C     *     selects random access. The data output format for the
0019  C     *     RTD temperature measurement is set up by the word
0020  C     *     RESBU1 which selects channel 1 on the first gate card
0021  C     *     and the full scale output to 102.4 millivolts. The data
0022  C     *     is acquired for the reference temperature by subprogram
0023  C     *     TSCA3.
0024  C     *
0025  C     ******************************************************
0026
0027  C
0028        INTEGER REFSIG,REFBU1,RESBU1,CTLWD,CTR
0029        COMMON REFSIG,PLTTEM,CTR
0030  C     REFBU1=9*256+SLOT3
0031        REFBU1=2307
0032  C     RESBU1=16+GAIN-1
0033        RESBU1=18
0034  C     REFBU1=256*5+3
0035        CTLWD=1283
0036  C
0037  C  Select card address 3, disable interrupt, select random access mode
0038  C
0039        CALL SECW(8,0,CTLWD,1)
0040  C
0041  C  Get data and store in REFSIG
0042  C
0043        CALL SECR(9,0,REFSIG,1)
0044  C
0045  C  Select card address 3, enable interrupt, select random access mode
```

```
0046  C
0047           CALL SECW(8,0,REFBU1,1)
0048  C
0049  C    Select channal 1 and set gain to 102.4 mv fullscale
0050  C
0051           CALL SECW(9,0,RESBU1,1)
0052           RETURN
0053           END 0001  FTN4,L
0002           SUBROUTINE TSCA3
0003  C
0004  C   ********************************************************
0005  C   *
0006  C   *    This subroutine acquires the data for the RTD reference
0007  C   *    temperature and using the calibration data acquired by
0008  C   *    subprogram TSCA2 calculates the reference temperature for
0009  C   *    use in calculating the temperature in degrees Celsius of
0010  C   *    of the 24 thermal expansion bolts.
0011  C   *
0012  C   *    The RTD measurement is stored in RESSIG and the
0013  C   *    calculated value for reference temperature is stored in
0014  C   *    PLTTEM.
0015  C   *
0016  C   ********************************************************
0017
0018           COMMON REFSIG,PLTTEM
0019           INTEGER RESSIG,REFSIG,CTLWD
0020           DATA RA,RC/121.79,100.12/
0021  C
0022  C        RK=5500./(RA-RC)
0023           RK=253.81
0024  C        RD=RC/100.
0025           RD=1.0012
0026  C        CTLWD=256*5+3
0027           CTLWD=1283
0028  C
0029  C    Select card address 3 and turn off interrupt
0030  C
0031  C    Get data and store it in RESSIG
0032  C
0033           CALL SECW(8,0,CTLWD,1)
0034           CALL SECR(9,0,RESSIG,1)
0035           RRSSIG=RESSIG
0036           RRFSIG=REFSIG
0037           PLTTEM=RK*(RRSSIG/RRFSIG-RD)
0038           RETURN
0039           END 0001  FTN4,L
0002           SUBROUTINE TSCA4
0003  C
0004  C   ********************************************************
```

```
0005  C    *
0006  C    *    Five subprograms are called by FILMC to get temperature
0007  C    *    data from the CPI interface.  This subprogram initiates
0008  C    *    the scan of each thermocouple.  If thermocouples 1 thru
0009  C    *    6 are being scanned card address 3 and channels 2 thru
0010  C    *    7 of gate card 0 are selected.  If thermocouples 7 thru
0011  C    *    14 are being scanned card address 3 and channels 0 thru
0012  C    *    7 of gate card 1 are selected.  If thermocouples 15
0013  C    *    thru 22 are scanned card address 6 and channels 0 thru
0014  C    *    7 of gate card 0 are selected. For thermocouples 23 and
0015  C    *    24 card address 6 and channels 0 and 1 of gate card 1
0016  C    *    are selected.
0017  C    *
0018  C    *    The thermocouple data set up by this subroutine are
0019  C    *    read by subroutine TSCA5.
0020  C    *
0021  C    ****************************************************************
0022  C
0023  C
0024        COMMON REFSIG,PLTTEM,CTR
0025        INTEGER TEMBU3,CCRD1,CCRD2,CTR,TEMBU1,TEMBU2,GAIN
0026        INTEGER CHAN,REFSIG
0027        DATA GAIN/3/
0028  C
0029  C       INITIALIZE
0030  C
0031  C     CCRD2=9*256+SLOT6
0032        CCRD2=2310
0033  C     CCRD1=9*256+SLOT3
0034        CCRD1=2307
0035  C     GET 24 TEMPERATURES
0036  C
0037        CTR=CTR+1              !CTR is set to 0 by FILMC program
0038        CHAN=CTR+1
0039        IF (CTR.GT.14)CHAN=CHAN-16
0040        TEMBU2=CHAN*16+GAIN
0041        IF (CTR .LE. 14) THEN
0042             TEMBU1=CCRD1
0043        ELSE
0044             TEMBU1=CCRD2
0045        ENDIF
0046  C
0047  C   Set up control word to get temperature
0048  C
0049        CALL SECW(8,0,TEMBU1,1)
0050  C
0051  C   Send control word to get temperature
0052  C
0053        CALL SECW(9,0,TEMBU2,1)
0054  C
0055        RETURN
0056        END
```

```
0001  FTN4,L
0002        SUBROUTINE TSCA5
0003  C
0004  C     ****************************************************
0005  C     *
0006  C     *    Five subprograms are called by FILMC to get temperature
0007  C     *    data from the CPI interface.  This subprogram reads the
0008  C     *    thermocouple output voltage, corrects for thermocouple
0009  C     *    nonlinearity and adds the reference offset voltage.
0010  C     *    The resulting temperature measurement is stored in the
0011  C     *    data base under TPCUR by calling the WRVAL subprogram.
0012  C     *
0013  C     ****************************************************
0014  C
0015        EXTERNAL TPCUR
0016        COMMON REFSIG,PLTTEM,CTR
0017        DIMENSION C(4)
0018        REAL TEMPER,TEMBUF,PLTTEM,SCALE
0019        INTEGER TEMBU3,CARD1,CARD2,CTR,IDATA,REFSIG
0020        DATA C(1),C(2),C(3)/1.9323799E-2,-1.0306020E-7,3.7084018E-12/
0021        DATA C(4)/-5.1031937E-17/
0022  C
0023  C     Initialize
0024  C
0025        SCALE=5
0026  C
0027  C     CARD2=5*256+SLOT6
0028        CARD2=1286
0029  C     CARD1=5*256+SLOT3
0030        CARD1=1283
0031  C     Get 24 Temperatures. The counter CTR is setup by the subprogram TSCA4
0032  C     which initiates the temperature measurement.
0033  C
0034        IF (CTR .LE. 14) THEN
0035             TEMBU3=CARD1
0036        ELSE
0037             TEMBU3=CARD2
0038        ENDIF
0039  C
0040  C     Get thermocouple output stored in 11 bits which = 10.24 full scale.
0041  C     The gate card and channel were previously set up by subprogram TSCA4
0042  C     which set the card up for a measurement on the previous cycle.
0043  C
0044        CALL SECW(8,0,TEMBU3,1)
0045        CALL SECR(9,0,IDATA,1)
0046        TEMBUF=IDATA
0047  C
0048  C     Compute Temperature
0049  C
0050        TEMBUF=TEMBUF*SCALE
0051        TEMPER=TEMBUF*(C(1)+TEMBUF*(C(2)+TEMBUF*(C(3)+TEMBUF*C(4))))
0052        TEMPER=TEMPER+ PLTTEM
0053  C
```

```
0054  C     Store Temperature
0055  C
0056        IF(CTR .LT. 1)GOTO 101
0057        IF(CTR .GT. 24)GOTO 101
0058  C
0059  C        CHECK FOR TEMPERATURE FLYERS!!!
0060  C
0061        CALL RDVAL(TPCUR,TLAST,CTR)
0062        IF(TLAST .LE. 25)GOTO 123
0063        IF(ABS(TLAST-TEMPER) .GE. 10.)TEMPER=TLAST
0064    123 CONTINUE
0065        CALL WRVAL(TPCUR,TEMPER,CTR)
0066    101 RETURN
0067        END 0001  FTN4,L
0002        SUBROUTINE BOLTP
0003  C
0004  C     ****************************************************************
0005  C     *                                                              *
0006  C     * Program to transfer percentage time on of the die bolt heaters *
0007  C     * to the microcomputer through the parallel interface card (PIC).*
0008  C     * This program is called by the FILMC program and retrieves data *
0009  C     * stored in the data base under TPCNT.                          *
0010  C     *                                                              *
0011  C     *                                                              *
0012  C     *                                                              *
0013  C     ****************************************************************
0014  C
0015  C
0016        INTEGER BUFR(24), CNTWD, BUFLN, PRAM1, PARMS(5)
0017        INTEGER TPCNT
0018        EXTERNAL TPCNT
0019
0020
0021        PRAM1 = 0
0022        BUFLN = 24
0023
0024  C    Clear and reset PIC
0025        CNTWD = 40014B
0026        CALL EXEC(3, CNTWD, PRAM1)
0027
0028  C    Set DVP1 value (driver parameter #1)
0029        CNTWD = 44014B
0030        CALL EXEC(3, CNTWD, PRAM1)
0031
0032  C     Get percentage data from PIR
0033  C
0034        CALL RDVAL(TPCNT,BUFR)
0035  C
0036  C     Output data to parallel card
0037  C
0038        CNTWD = 40014B
0039        CALL EXEC(2, CNTWD, BUFR, BUFLN, PRAM1)
0040
0041
0042  C
```

```
0043  C         Get & report status of the card.
0044  C         CALL EXEC(3, 40614B, PRAM1)
0045  C
0046  C         CALL RMPAR(PARMS)
0047  C
0048

0001  FTN4,L
0002        SUBROUTINE FLOOP(J,TK)                       ── 201
0003        COMMON REFSIG,PLTTEM,CTR,DCPON,SCANNO
0004        EXTERNAL TPER0,TPER1,TPER2,TPCUR,TPPRO,TPWND,TPACH,TPACL,TPS
ET,T
0005     1PCNT
0006        INTEGER TON,IKNT,CTR,REFSIG,DCPON,FIRPA,FIRSC,RESET,DATRDY
0007        DIMENSION OK(24,2),TK(24,2),X(24),P(24,25),S(24),A(24,3,3),C
(24,3)
0008        DIMENSION BIA(24)
0009        REAL KPT
0010        CALL RDVAL(TPER1,TER1,J)
0011        CALL RDVAL(TPER2,TER2,J)
0012        CALL RDVAL(TPCUR,TEMP,J)
0013        CALL RDVAL(TPPRO,KPT,J)        202
0014        CALL RDVAL(TPWND,TPT,J)
0015        CALL RDVAL(TPACH,TLAM,J)
0016        CALL RDVAL(TPACL,TTDER,J)
0017        CALL RDVAL(TPSET,TSET,J)
0018        TER=TSET-TEMP                     ── 74
0019        IF(KPT .LE. 0 .OR. TPT .LE. 0)THEN
0020           KPT=0.75
0021           TPT=900                        203
0022        ENDIF
0023        IF(KPT .GE. 10)KPT=10
0024        IF(TPT .GE. 1500)TPT=1500
0025        CALL RDVAL(TPCNT,TON,J)          ── 204
0026        TK(J,1) = TK(J,2)
0027        OK(J,1) = OK(J,2)
0028        TK(J,2) =TEMP
0029        OK(J,2) =TON
0030        IF(IFLFL .GT. 0)GOTO 600
0031        TK(J,1)=TK(J,2)
0032        OK(J,1)=OK(J,2)
0033        A(J,1,1)=TK(J,1)*TK(J,1)
0034        A(J,1,2)=TK(J,1)*OK(J,1)
0035        A(J,1,3)=TK(J,1)                  205
0036        A(J,2,2)=OK(J,1)*OK(J,1)
0037        A(J,2,3)=OK(J,1)
0038        C(J,1)=A(J,1,1)
0039        C(J,2)=A(J,1,2)
0040        C(J,3)=A(J,1,3)
0041        IF(J .EQ. 24)IFLFL=1
0042    600 CONTINUE
0043        Q=0.1813
0044        R=1-Q
0045        A(J,1,3)=Q*TK(J,1)+R*A(J,1,3)
0046        A(J,1,1)=Q*TK(J,1)*TK(J,1)+R*A(J,1,1)
0047        A(J,1,2)=Q*TK(J,1)*OK(J,1)+R*A(J,1,2)    206
0048        A(J,2,1)=A(J,1,2)
0049        A(J,2,2)=Q*OK(J,1)*OK(J,1)+R*A(J,2,2)
0050        A(J,2,3)=Q*OK(J,1)+R*A(J,2,3)
0051        A(J,3,1)=A(J,1,3)
0052        A(J,3,2)=A(J,2,3)
0053        A(J,3,3)=1
0054        C(J,1)=Q*TK(J,2)*TK(J,1)+R*C(J,1)
0055        C(J,2)=Q*TK(J,2)*OK(J,1)+R*C(J,2)
0056        C(J,3)=Q*TK(J,2)+R*C(J,3)        ── 206
0057        IF(J .EQ. 24)IFLFL=IFLFL+1
0058        TSAMP=30
0059        CON2=EXP(-TSAMP/TPT)
0060    703 PREDT=CON2*TK(J,1)+KPT*(1-CON2)*OK(J,2)+BIA(J)    207
```

```
0061  C     WRITE(1,967)J,TEMP,PREDT
0062    967 FORMAT(5X,'LANE ',I2,,' TEMP ',F6.2,' PREDT ',F6.2)
0063        IF(ABS(PREDT-TEMP) .LE. 0.3)GOTO 801                    ——— 208
0064  C     DO 608 I=1,3
0065  C     WRITE(1,607)(A(J,I,L),L=1,3),C(J,I),IFLFL
0066  C 608 CONTINUE
0067    607 FORMAT(5X,4(F10.4,3X),I4)
0068        IF(IFLFL .LE. 5)GOTO 801
0069        DO 709 I=1,3
0070        DO 710 L=1,3                                            ——— 209
0071    710 P(I,L)=A(J,I,L)
0072    709 S(I)=C(J,I)
0073        CALL GJR(P,S,X,3,1,NRET)
0074        IF(NRET .EQ. 0)GOTO 801
0075  C     WRITE(1,607)(X(I),I=1,3),0,IFLFL
0076        IF(X(1) .LE. 0)GOTO 801
0077        TPT=-TSAMP/ALOG(X(1))
0078        BIA(J)=X(3)
0079        KPT=X(2)/(1-X(1))
0080    801 CONTINUE                                                ——— 210
0081        IF(KPT .LE. 0 .OR. TPT .LE. 0)THEN
0082        KPT=0.75
0083        TPT=900
0084        ENDIF
0085        IF(KPT .GE. 10)KPT=10
0086        IF(TPT .GE. 1500)TPT=1500
0087        IF(KPT .LE. 0.1)KPT=0.1
0088        CON1=EXP(-TSAMP/TLAM)
0089        CON2=EXP(-TSAMP/TPT)
0090        TX=TER
0091        IF(TX .GT. 10)TX=10                                     ——— 82
0092        IF(TX .LT. -10)TX=-10
0093        TON=OK(J, 2)+(1-CON1)/(KPT*(1-CON2))*TER-(CON2-CON1*CON
0094       12)/(KPT*(1-CON2))*TER1+TTDER*TX
0095        IF(TON .GT. 99)TON=99
0096        IF(TON .LT. 0)TON=0
0097    800 CONTINUE
0098        CALL WRVAL(TPPRO,KPT,J)
0099        CALL WRVAL(TPWND,TPT,J)
0100        CALL WRVAL(TPCNT,TON,J)                                 ——— 211
0101        CALL WRVAL(TPERO,TER,J)
0102        CALL WRVAL(TPER1,TER,J)
0103        CALL WRVAL(TPER2,TER1,J)
0104        RETURN                                                  ——— 212
0105        END

0001  FTN4,L
0002        PROGRAM DSTOR
0003  C
0004  C ****************************************************************
0005  C *                                                              *
0006  C *  Program to receive data from the LFE program and store it   *
0007  C *  on the disk. The program is called by the LFE program       *
0008  C *  which gets thickness data from the LFE gage.                *
0009  C *                                                              *
0010  C *     The data is stored in 'PROFIL' as follows:               *
0011  C *                                                              *
0012  C *         TIME - WORDS 1 TO 5                                  *
0013  C *         LENGTH OF DATA - WORD 6                              *
0014  C *         DATA - STARTS AT WORD 7                              *
0015  C *                                                              *
0016  C *                                                              *
0017  C *                                                              *
0018  C ****************************************************************
0019  C
0020  C
```

```
0021        INTEGER IDCB(272),IBUF(256),INAM(3),ISIZ(2),IBUFF(256)
0022        INTEGER ITIME(5),ILEN,IA,IB,IBUF2(128)
0023        EQUIVALENCE(ITIME,IBUF)
0024        EQUIVALENCE(IB,IBUF(6))
0025        EQUIVALENCE(IBUF(129),IBUF2)
0026        EQUIVALENCE(IBUFF,IBUF(7))
0027        DATA INAM/2HPR,2HOF,2HIL/
0028        DATA ISIZ/256,128/       !256 BLOCKS,128 WORD PER BLOCK
0029        ITYPE=2
0030        ILEN=256
0031        IOPTN=1                  !CAN BE CALLED FROM SEVERAL PROGRAMS
0032        ICR=-17                  !LU
0033        INUM=1                   !FILE RECORD NUMBER
0034 C
0035 C   PURGE FILE 'PROFIL' IF IT EXISTS
0036 C
0037        CALL PURGE(IDCB,IERR,INAM)
0038 C
0039 C   CREATE FILE 'PROFIL' ON CARTRIDGE 17
0040 C
0041        CALL CREAT(IDCB,IERR,INAM,ISIZ,ITYPE,0,ICR)
0042        IF(IERR.LT.0)THEN
0043          IFLAG=1
0044          GOTO 999
0045          ENDIF
0046 C
0047 C   CLOSE FILE
0048 C
0049        CALL CLOSE(IDCB)
0050
0051 C
0052 C   GET DATA AND STORE IN NEXT RECORD OF 'PROFIL'
0053 C
0054    10  CONTINUE
0055 C
0056 C   GET DATA FROM FATHER  -  ILEN IS THE LENGTH OF DATA BUFFER
0057 C
0058        CALL EXEC(14,IBUFF,ILEN)
0059
0060        CALL ABREG(IA,IB)
0061        IF(IA.EQ.1)GOTO 999       !IF IA=1 THEN NO DATA IS PRESENT
0062 C
0063 C   GET TIME; TIME(2)=SECS, TIME(3)=MINUTES, TIME(4)=HOURS
0064 C
0065        CALL EXEC(11,ITIME)
0066 C
0067 C   OPEN FILE
0068 C
0069        CALL OPEN(IDCB,IERR,INAM,IOPTN,0,ICR)
0070        IF(IERR.LT.0)THEN
0071          IFLAG=2
0072          GOTO 999
0073          ENDIF
0074 C
0075 C   WRITE NEXT RECORD (INUM IS RECORD NUMBER)
0076 C
0077        CALL WRITF(IDCB,IERR,IBUF,256,INUM)
0078        INUM=INUM+1                        !INCREMENT RECORD NUMBER
0079        IF(IERR.LT.0)THEN
0080          IFLAG=3
0081          GOTO 999
0082          ENDIF
0083        CALL WRITF(IDCB,IERR,IBUF2,128,INUM)
0084        INUM=INUM+1
0085 C
```

```
0086 C    CLOSE FILE
0087 C
0088      CALL CLOSE(IDCB)
0089      GOTO 20
0090 C
0091 C    ERROR HANDLER
0092 C
0093 999  WRITE(1,99)IFLAG,IERR
0094 99   FORMAT("FILE ACCESS ERROR AT LOCATION ",I2,"ERR CODE",I3)
0095 C
0096 C    SUSPEND
0097 C
0098 20   CALL EXEC(6,0,1)
0099 C
0100 C    GO BACK FOR MORE WHEN CALLED AGAIN
0101 C
0102      GOTO 10
0103      END

0001 FTN4,L
0002      SUBROUTINE THKLO(M,TK,TG,DC)           — 300
0003 C************************************************************
0004 C**
0005 C**                    SUBROUTINE THKLO(M,TK,TG,DC)
0006 C**
0007 C**  This subroutine is the primary control program for the film
0008 C**  thickness loop.  It is called from the mainline program,
0009 C**  FILMY, once per lane each sample. Parameters passed are:
0010 C**
0011 C**                M --- The lane number:
0012 C**                         1 to 24 --- Actual bolt #
0013 C**                         25      --- Decoupler calculation
0014 C**                TK --- The matrix of temperature values
0015 C**                         of the bolts; from the 2 last scans.
0016 C**                TG --- The matrix of filtered temperatures.
0017 C**
0018 C**
0019 C**  Control variable data, lane thickness, is passed into this
0020 C**  program through the EXTERNAL buffers:
0021 C**
0022 C**                THCUR --- The matrix of most recent thicknesses
0023 C**                THSET --- The matrix of thickness setpoints
0024 C**                THPRO --- The matrix of controller gains
0025 C**                THDED --- The matrix of reset times
0026 C**                THWND --- The matrix of derivative times
```

```
0027 C**
0028 C**  Sample time, TS, is also passed into program through COMMON.
0029 C**  This program then calculates and stores the following buffers
0030 C**
0031 C**                THER0 --- The matrix of current thickness error
0032 C**                THER1 --- The matrix of past sample errors
0033 C**                THER2 --- The matrix of errors 2 samples past
0034 C**                TPSET --- The matrix of calculated temp setpts
0035 C**
0036 C**
0037 C**  The control strategy first checks to see if the process model
0038 C**  for lane M adequately describes the actual process data.  If
0039 C**  not, the program calls the identification routine which is a
0040 C**  least squares estimator.  The estimator calculates the value
0041 C**  of two parameters, the process gain relating thickness to
0042 C**  bolt temperature and the lane interaction constant that
0043 C**  describes the effect that a change in bolt temperature on lane
0044 C**  I has on thickness in lanes I+1 and I-1.  The parameters that
0045 C**  are chosen are the values which minimize the squared error
0046 C**  between model prediction and recent process data.
0047 C**  The control algorithm for each lane is a discrete version of
0048 C**  the velocity form of the PID controller.  Each time the
0049 C**  program is called for M=1 to 24 the controller output, change
0050 C**  in temperature setpoint, is calculated from the PID algorithm
0051 C**  for that lane.  When the program is called and M=25, the
0052 C**  decoupler is calculated by inverting the gain matrix.  The 24
0053 C**  individual outputs are then modified by the decoupler to
0054 C**  negate the effect of lane to lane interaction.  Then the
0055 C**  updated values of controller output are placed in the EXTERNAL
0056 C**  buffer, TPSET, and program control is returned to FILMY.
0057 C**
0058 C**
0059 C**
0060 C**
```

```
0061  C**
      **
0062  C**
      **
0063  C**
      **
0064  C*****************************************************************
      ***
0065        COMMON REFSIG,PLTTEM,CTR,DCPON,SCANNO,IFLFL,MODE
0066        COMMON G(24),U(24),THDIFT,PAR1,ADAPT,LANEST
0067        EXTERNAL TPSET,THER0,THER1,THER2,THCUR,TSCN1,THPRO,THDED,THW
      ND
0068        EXTERNAL THSET,TPCNT,TPCUR,TSCN2
0069        INTEGER DCPON,REFSIG,CTR,FIRPA,FIRSC,RESET,DATRDY,TN(24),XX
0070        INTEGER CONLO,CONHI
0071        REAL MULT
0072        DIMENSION THC(24), THK(24),TMP(24),P(24,25),Q(24),H(24),GI(2
      4,24)
0073        DIMENSION UD(24),IA(2),TK(24, 2),T1(24),TP(24),TC(24),KM(24
      ,24)
0074        DIMENSION ITIME(5),DC(24,24),AX(8),FX(8),TG(24,2),NO(24),INA
      M(3)
0075        EQUIVALENCE (AVE,IA(1))
0076        DATA INAM/2HDS,2HPL,2H3 /
0077        TS=160./60.
0078        DCPFLG=0
0079  C
0080        IF(M .EQ. 1)THDIFT=0
0081        IF(SCANNO .GT. 0)GOTO 544
0082        CALL RDVAL(THCUR,TH,M)
0083        CALL WRVAL(TSCN1,TH,M)
0084        ACERR=.02
0085        PAR1=0.6
0086        GAVE=-.0625
0087   544  IF(M .EQ. 25)GOTO 32
0088        G(M)=-.0625
0089        CALL RDVAL(THCUR,THCKA,M)          ← 301
0090        CALL WRVAL(TSCN2,THCKA,M)
0091        CALL RDVAL(TSCN1,TFILT,M)
0092        FILT=.50                              } 302
0093        THCKA=FILT*THCKA+(1.-FILT)*TFILT
0094        CALL WRVAL(THCUR,THCKA,M)
0095        THK(M) =  THCKA-2
0096        DO 78 I=1,24
0097        TMP(I) =  TG(I,1)
0098    78 CONTINUE
0099        IF(DCPON .NE. 1)GOTO 200
0100        IF(ADAPT .NE. 1)GOTO 200
0101        THCKP=2
0102        DO 4 J=1,24
0103        KM=ABS(M-J)
0104        MULT=PAR1**KM
0105        IF(KM .GT. 4)MULT=0
0106        THCKP=THCKP+G(M)*TMP(J)*MULT
0107     4 CONTINUE
0108        THDIF=THCKP-THCKA
0109        THDIFT=THDIFT+ABS(THDIF)
0110        IF(ABS(THCKP-THCKA)/THCKA .LT. ACERR)GOTO 200
0111        DIV=0
0112   403 DO 727 I=1,24
0113        KM=ABS(M-I)
0114        MULT=PAR1**KM
0115        IF(KM .GT. 4)MULT=0
0116        DIV=DIV+MULT*TMP(I)
0117   727 CONTINUE
0118        G(M)   =THK(M)/DIV
0119        IF(M .EQ. 1)GOTO 404
```

```
0120        IF(G(M)   .GE. 0)G(M)   =G(M-1)
0121        GOTO 405
0122    404 IF(G(1)   .GE. 0)G(1)   =-.0625
0123    405 DCPFLG=1
0124    200 CALL RDVAL(TFSET,TMPSP,M)
0125        CALL RDVAL(THER0,TE1,M)
0126        CALL RDVAL(THER1,TE2,M)
0127        CALL RDVAL(THPRO,PB,M)
0128        CALL RDVAL(THDED,TI,M)
0129        CALL RDVAL(THWND,TD,M)
0130        CALL RDVAL(THSET,SET,M)
0131        CALL RDVAL(THCUR,TH,M)
0132        CALL RDVAL(TFCUR,TMPCU,M)
0133        THF=TH-8./64.*(TMPSP-TMPCU)
0134        TE=SET-THF
0135        CONLO=LANEST
0136        CONHI=25-LANEST
0137        IF(M .LE. CONLO .OR. M .GE. CONHI)GO TO 709
0138        IF(SCANNO .EQ. 0) THEN
0139        TE1=TE
0140        TE2=TE
0141        ENDIF
0142        IF(SCANNO .EQ. 1)TE2=TE1
0143    708 U(M)=100/PB*(TE-TE1+TS/TI*TE+TD/TS*(TE-2*TE1+TE2))
0144    709 CONTINUE
0145        CALL WRVAL(TSCN1,THCKA,M)
0146        CALL WRVAL(THER0,TE,M)
0147        CALL WRVAL(THER1,TE1,M)
0148        CALL WRVAL(THER2,TE2,M)
0149        IF(M .NE. 25)GOTO 30
0150   C
0151   C******** NOW CHECK TO SEE HOW MANY LANES ON EACH SIDE WILL BE NEGLECTED
0152   C
0153     32 IF(LANEST .NE. 3)GOTO 33
0154   C
0155   C******** USE THE ALGORITHM BELOW FOR 3 UNCONTROLLED LANES ON EACH SIDE
0156   C
0157     36 U(1)=.25*U(4)
0158        U(2)=.50*U(4)
0159        U(3)=.75*U(4)
0160        U(22)=.75*U(21)
0161        U(23)=.50*U(21)
0162        U(24)=.25*U(21)
0163        GOTO 35
0164     33 IF(LANEST .NE. 2)GOTO 34
0165   C
0166   C********* USE THE ALGORITHM BELOW FOR 2 UNCONTROLLED LANES ON EACH SIDE
0167   C
0168        U(1)=.33*U(3)
0169        U(2)=.67*U(3)
0170        U(24)=.33*U(22)
0171        U(23)=.67*U(22)
0172        GOTO 35
0173     34 IF(LANEST .NE. 1)GOTO 36
0174   C
0175   C******* USE THE ALGORITHM BELOW FOR 1 UNCONTROLLED LANE ON EACH SIDE
0176   C
0177        U(1)=.5*U(2)
0178        U(24)=.5*U(23)
0179     35 CONTINUE
0180        IF(DCPON .NE. 1)GOTO 31
0181        IF(ADAPT .NE. 1)GOTO 750
0182        CALL RDVAL(THSET,AVTHIK,12)
```

```
0183            IF(THDIFT/(24*AVTHIK)      .LT. .1)GOTO 666
0184            AL=PAR1-.3
0185            AH=PAR1+.3
0186            IF(AH .GT. .75)AH=.75
0187            IF(AL .LT. .25)AL=.25
0188            A=AL
0189            XX=1
0190            CALL RDVAL(THCUR,THC)
0191            DO 501 KNTR=1,6
0192        512 DO 502 K=1,24
0193            THK(K)=THC(K)-2
0194            DO 503 I=1,24
0195        503 TMP(I)=TG(I,1)
0196            DIV=0
0197            DO 504 I=1,24
0198            KM=ABS(K-I)
0199            MULT=A**KM
0200            IF(KM .GT. 4)MULT=0
0201        504 DIV=DIV+MULT*TMP(I)
0202        502 G(K)   =THK(K)/DIV
0203        507 XSUM=0
0204            DO 505 I=1,24
0205        505 XSUM=XSUM+G(I)
0206            GAVE=XSUM/24
0207            KWIT=0
0208            DO 506 I=1,24
0209            ERR=G(I)-GAVE
0210            IF(ABS(ERR)/GAVE .LT. .8)GOTO 506
0211            KWIT=1
0212            G(I)=GAVE
0213        506 CONTINUE
0214            IF(KWIT .EQ. 1)GOTO 507
0215            THDIF=0
0216            DO 508 K=1,24
0217            THCKP=2
0218            DO 509 I=1,24
0219            KM=ABS(K-I)
0220            MULT=A**KM
0221            IF(KM .GT. 4)MULT=0
0222        509 THCKP=THCKP+GAVE*TMP(I)*MULT
0223        508 THDIF=THDIF+ABS(THCKP-THC(K))
0224            IF(GAVE .GE. 0)THDIF=THDIF+1.E30
0225            IF(KNTR .NE. 1)GOTO 511
0226            IF(XX .GT. 8)GOTO 511
0227            AX(XX)=A
0228            FX(XX)=THDIF
0229            XX=XX+1
0230            A=A+.125*(AH-AL)
0231            IF(XX .NE. 9)GOTO 512
0232            FKEEP=1E30
0233            DO 513 I=1,8
0234            IF(FX(I) .GT. FKEEP)GOTO 513
0235            IKEEP=I
0236            FKEEP=FX(I)
0237        513 CONTINUE
0238            AS=AX(IKEEP)
0239            FS=FX(IKEEP)
0240            IL=IKEEP-1
0241            IF(IL .LE. 1)IL=1
0242            AL=AX(IL)
0243            IH=IKEEP+1
0244            IF(IH .GE. 8)IH=8
0245            AH=AX(IH)
0246            A=AL+.618*(AH-AL)
0247            GOTO 501
0248        511 F=THDIF
0249            IF(A .LT. AS)GOTO 514
```

```
0250            IF(F .GT. FS)GOTO 515
0251            AL=AS
0252            AS=A
0253            FS=F
0254            A=AL+.618*(AH-AL)
0255            GOTO 501
0256        515 AH=A
0257            A=AH-.618*(AH-AL)
0258            GOTO 501
0259        514 IF(F .GT. FS)GOTO 516
0260            AH=AS
0261            AS=A
0262            FS=F
0263            A=AH-.618*(AH-AL)
0264            GOTO 501
0265        516 AL=A
0266            A=AL+.618*(AH-AL)
0267        501 CONTINUE
0268            IF(ABS(PAR1-A) .LT. .03)GOTO 665
0269            PAR1=A
0270            DO 518 I=1,24
0271            G(I)=GAVE
0272            DO 518 J=1,24
0273        518 P(I,J)=0
0274        750 IF(ADAPT .NE. 1 .AND. SCANNO .GT. 0)GOTO 666
0275            DO 519 MM=1,24
0276            DO 520 I=1,24
0277            KM=ABS(I-MM)
0278            P(MM,I)=PAR1**KM
0279            IF(KM .GT. 4)P(MM,I)=0
0280        520 CONTINUE
0281            Q(I)=1.
0282        519 CONTINUE
0283            CALL GJR(P,Q,Q,24,0,NRET)
0284            IF(NRET .EQ. 0)GOTO 31
0285    762     DO 99 I=1,24
0286            DO 98 J=1,24
0287         98 GI(I,J)=P(I,J)/GAVE
0288            IF(GI(I,I) .NE. 0)GOTO 517
0289            H(I)=0
0290            GOTO 99
0291        517 H(I)=1/GI(I,I)
0292         99 CONTINUE
0293            DO 20 I=1,24
0294            DO 20 J=1,24
0295         20 DC(I,J)=GI(I,J)*H(I)
0296        665 PB=100*GAVE/.924
0297            DO 668 I=1,24
0298            CALL WRVAL(THPRO,PB,I)
0299        668 CONTINUE
0300        666 DO 21 I=1,24
0301            UD(I)=0.
0302            DO 22 J=1,24
0303            IF(ABS(J-I) .GT. 4)GOTO 22
0304            UD(I)=UD(I)+U(J)*DC(I,J)
0305         22 CONTINUE
0306         21 CONTINUE
0307            DO 25 I=1,24
0308         25 WRITE(1,202)I,U(I),UD(I)
0309        202 FORMAT(' I=',I4,' NORMAL CHANGE= ',F10.3,' DECOUPLED CHANGE=
0310           1 ',F10.3)
0311            IFLAG=1
0312            DO 26 I=1,24
0313            CALL RDVAL(TPSET,TMPST,I)
0314            TMPO=TMPST
0315            TMPST=TMPST+UD(I)
```

```
0316            IF(TMPST .LT. 25)TMPST=25
0317            IF(TMPST .GT. 250)TMPST=250
0318     C      WRITE(1,203)I,TMPO,TMPST
0319            CALL WRVAL(TPSET,TMPST,I)
0320       26 CONTINUE
0321            GOTO 40
0322       31 DO 27 I=1,24
0323            CALL RDVAL(TPSET,TMPST,I)
0324            CALL RDVAL(TPCUR,TMPCU,I)
0325            TMPO=TMPST
0326            TMPST=TMPST+U(I)
0327            IF(TMPST .LT. 25)TMPST=25
0328            IF(TMPST .GT. 250)TMPST=250
0329     C      WRITE(1,203)I,TMPO,TMPST
0330      203 FORMAT('  LANE',I3,' OLD TEMP SP:',F10.2,' NEW SP:',F10.2)
0331            CALL WRVAL(TPSET,TMPST,I)
0332       27 CONTINUE
0333       40 CALL EXEC(11,ITIME)
0334            CALL RDVAL(THSET,SET,12)
0335            WRITE(6,41)ITIME(4),ITIME(3),ITIME(2),SET
0336       41 FORMAT(/,10X,I2,':',I2,':',I2,5X,'TH. SETPT.=',F5.3)
0337            CALL RDVAL(THCUR,T1)
0338            CALL RDVAL(TPSET,TP)
0339            CALL RDVAL(TPCUR,TC)
0340            CALL RDVAL(TPCNT,TN)
0341            DO 301 L=1,24
0342            TN(L)=IAND(377B,TN(L))
0343      301 CONTINUE
0344            DO 712 JJ=1,24
0345      712 NO(JJ)=JJ
0346            DO 442 KK=1,2
0347            IL=1
0348            IH=12
0349            IF(KK .EQ. 1)GOTO 50
0350            IL=13
0351            IH=24
0352       50 WRITE(6,713)(NO(II),II=IL,IH)
0353            WRITE(6,43)(T1(II),II=IL,IH)
0354            WRITE(6,44)(TP(II),II=IL,IH)
0355            WRITE(6,45)(TC(II),II=IL,IH)
0356            WRITE(6,46)(TN(II),II=IL,IH)
0357      442 CONTINUE
0358            AVG=SET
0359     C      CALL EXEC(10,INAM,IA(1),IA(2))
0360       43 FORMAT(' THICK. ',12(2X,F6.3))
0361      713 FORMAT(/,' LANE #',12(4X,I2,2X))
0362       44 FORMAT(' TP.SP.',12(2X,F6.1))
0363       45 FORMAT(' TEMP  ',12(2X,F6.1))
0364       46 FORMAT(' % ON  ',12(2X,I6))
0365       30 IF(M .EQ. 25)SCANNO=SCANNO+1
0366            RETURN
0367            END

0001     FTN4,L
0002            SUBROUTINE GJR(A,C,X,N,INDIC,NRET)
0003            DIMENSION A(24,25),C(24),X(24),IROW(24),JCOL(25),JORD(25),Y(25)
0004     C........BEGIN ELIMINATION PROCEDURE..........
0005            DO 10 I=1,N
0006       10 A(I,N+1)=C(I)
0007            MAX=N
0008            IF(INDIC .GE. 0)MAX=N+1
0009        5 DETER=1.
0010            DO 18 K=1,N
0011            KM1=K-1
0012     C
```

```
0013  C          .........SEARCH FOR THE PIVOT ELEMENT............
0014             PIVOT=0
0015             DO 11 I=1,N
0016             DO 11 J=1,N
0017  C          .........SCAN IROW AND JCOL ARRAYS FOR INVALID PIVOT SUBSCRIPTS......
0018             IF(K .EQ. 1)GOTO 9
0019             DO 8 ISCAN=1,KM1
0020             DO 8 JSCAN=1,KM1
0021             IF(I .EQ. IROW(ISCAN))GOTO 11
0022             IF(J .EQ. JCOL(JSCAN))GOTO 11
0023           8 CONTINUE
0024           9 IF(ABS(A(I,J)) .LE. ABS(PIVOT)) GOTO 11
0025             PIVOT=A(I,J)
0026             IROW(K)=I
0027             JCOL(K)=J
0028          11 CONTINUE
0029  C
0030  C          .....;INSURE THAT SELECTED PIVOT IS LARGER THAN EPS .........
0031             IF(ABS(PIVOT) .GT. 0.00001)GOTO 13
0032             NRET=0
0033             RETURN
0034  C
0035  C          ........UPDATE THE DETERMINANT VALUE .....................
0036          13 IROWK=IROW(K)
0037             JCOLK=JCOL(K)
0038             DETER=DETER*PIVOT
0039  C
0040  C          ........ NORMALIZE PIVOT ROW ELEMENTS ...................
0041             DO 14 J=1,MAX
0042          14 A(IROWK,J)=A(IROWK,J)/PIVOT
0043  C
0044  C          .........CARRY OUT ELIMINATION AND DEVELOP INVERSE .........
0045             A(IROWK,JCOLK)=1./PIVOT
0046             DO 18 I=1,N
0047             AIJCK=A(I,JCOLK)
0048             IF(I .EQ. IROWK)GOTO 18
0049             A(I,JCOLK)=-AIJCK/PIVOT
0050             DO 17 J=1,MAX
0051          17 IF(J .NE. JCOLK)A(I,J)=A(I,J)-AIJCK*A(IROWK,J)
0052          18 CONTINUE
0053  C
0054  C          ........ORDER SOLUTION VALUES (IF ANY) AND CREATE JORD ARRAY ........
0055             DO 20 I=1,N
0056             IROWI=IROW(I)
0057             JCOLI=JCOL(I)
0058             JORD(IROWI)=JCOLI
0059          20 IF(INDIC .GE. 0)X(JCOLI)=A(IROWI,MAX)
0060  C
0061  C          ........ADJUST SIGN OF DETERMINANT ..................
0062             INTCH=0
0063             NM1=N-1
0064             DO 22 I=1,NM1
0065             IP1=I+1
0066             DO 22 J=IP1,N
0067             IF(JORD(J) .GE. JORD(I))GOTO 22
0068             JTEMP=JORD(J)
0069             JORD(J)=JORD(I)
0070             JORD(I)=JTEMP
0071             INTCH=INTCH+1
0072          22 CONTINUE
0073             IF(INTCH/2*2 .NE. INTCH) DETER=-DETER
0074  C
0075  C          ........ IF INDIC IS POSITIVE RETURN WITH RESULTS ..........
```

```
0076              IF(INDIC .LE. 0)GOTO 26
0077              NRET=1
0078              RETURN
0079   C          ........ FIRST BY ROWS ......
0080           26 DO 28 J=1,N
0081              DO 27 I=1,N
0082              IROWI=IROW(I)
0083              JCOLI=JCOL(I)
0084           27 Y(JCOLI)=A(IROWI,J)
0085              DO 28 I=1,N
0086           28 A(I,J)=Y(I)
0087   C          ........ THEN BY COLUMNS ........
0088              DO 30 I=1,N
0089              DO 29 J=1,N
0090              IROWJ=IROW(J)
0091              JCOLJ=JCOL(J)
0092           29 Y(IROWJ)=A(I,JCOLJ)
0093              DO 30 J=1,N
0094           30 A(I,J)=Y(J)
0095   C
0096   C          .......RETURN FOR INDIC NEGATIVE OR ZERO
0097              NRET=1
0098              RETURN
0099              END

0001   ASMB,L
0002          NAM RDVAL,6    READ VALUE(S) FROM PIR DATA BASE
0003          EXT PIRSZ,DBADR,.ENTR
0004          ENT RDVAL
0005   ***************************************************************
**********
0006   *    . READ A VALUE FROM THE P.I.R. DATA BASE
            *
0007   *
              *         .
0008   *      CALL RDVAL(FIELD, BUFFER)            READ VALUES FOR ALL POI
NTS(24)   *
0009   *      CALL RDVAL(FIELD, VALUE, CHANNEL#)   READ ONLY CHANNEL#'S VA
LUE       *
0010   *
              *
0011   ***************************************************************
**********
0012   FIELD BSS 1         P.I.R. DESIRED VALUE OR "FIELD"
0013   BUFFR BSS 1         USER'S BUFFER ADDRESS
0014   POINT BSS 1         P.I.R. NO. OR CHANNEL NO. DESIRED
0015   *
0016   RDVAL NOP
0017         JSB .ENTR
0018         DEF FIELD     GET PARAMETER ADDRESSES
0019   *
0020         CLB,INB
0021         LDA FIELD,I   GET DESIRED OFFSET INTO POINT RECORD
0022         ADA =D-2      IF OFFSET IS LESS THAN 2...
0023         SSA
0024         JMP *+4
0025         ADA =D-59     ... OR GREATER THAN 60, THEN ...
0026         SSA
0027         INB           ... NO. OF WORDS PER VALUE = 1, ELSE = 2.
0028         CMB,INB
0029         STB WDCNT     USE IT AS LOOP COUNTER
0030         STB SAVCT     ... & SAVE IT FOR LATER USE AGAIN
0031   *
0032         LDA BUFFR     SET UP USER-BUFFER POINTER ...
0033         STA BFPTR     ... FOR MOVING WORDS.
0034   *
```

```
0035  *         SET LOOP COUNTER FOR GETTING ALL OR ONE VALUE
0036            LDB =D24
0037            LDA POINT       GET ADDRESS IN "POINT"
0038            SZA             IF IT IS ZERO, THEN ALL VALUES ARE REQUESTED
0039            CLB,INB
0040            CMB,INB
0041            STB LPCNT       SAVE AS LOOP COUNTER
0042  *
0043            SZA,RSS         IF NO POINT GIVEN, GO GET IT ALL.
0044            JMP MPY
0045            LDA POINT,I     OTHERWISE, SET ADDRESS OF FIRST VALUE
0046            ADA =D-1          LESS ONE FOR FINDING ADDRESS
0047  MPY       MPY PIRSZ       TIMES THE SIZE OF A POINT RECORD
0048            ADA DBADR
0049            ADA FIELD,I
0050            STA VADDR        SAVE THIS ADDRESS FOR LATER USE
0051            STA VALAD       = ADDRESS OF VALUE
0052  LOOP      LDA VALAD,I     GET THE VALUE FROM THE P.I.R.
0053            STA BFPTR,I     PUT IT IN USER'S BUFFER
0054  *
0055            ISZ BFPTR       INCREMENT BUFFER POINTER
0056            ISZ VALAD       INCREMENT ADDRESS OF VALUE(LOOK AT NEXT WORD)
0057            ISZ WDCNT       BUMP WORD COUNTER
0058            JMP LOOP        IF WORD COUNT NOT ZERO, MOVE ANOTHER WORD
0059  *
0060  *    IF MORE THAN ONE VALUE WAS REQUESTED, LOOP TO GET THEM
0061            LDA VADDR       GET ADDRESS OF LAST VALUE FIELD (OFFSET).
0062            ADA PIRSZ       ADD THE P.I.R. SIZE ...
0063            STA VADDR          ... TO GET ADDRESS OF NEXT POINT'S VALUE FIELD.
0064  *
0065            LDB SAVCT       RETRIEVE WORD COUNT AGAIN
0066            STB WDCNT
0067  *
0068            ISZ LPCNT       HAVE WE GOTTEN EVERYTHING REQUESTED?
0069            JMP LOOP-1      IF NOT, KEEP GOING.
0070  *
0071  *
0072  *    RETURN TO CALLER
0073  *
0074            CLA             ELSE, SET ADDRESS IN "POINT" TO ZERO FOR SUBSEQUENT CALLS
0075            STA POINT
0076            JMP RDVAL,I     RETURN
0077  *
0078  *
0079  *    DATA STORAGE
0080  *
0081  BFPTR BSS 1               POINTER INTO USER'S BUFFER
0082  WDCNT BSS 1               COUNT OF WORDS PER VALUE TO MOVE ( 1 OR 2 )
0083  SAVCT BSS 1               COPY OF ABOVE COUNT, BUT DOES NOT CHANGE
0084  LPCNT BSS 1               LOOP COUNTER FOR ACCESSING ALL P.I.R.S OR JUST ONE
0085  VADDR BSS 1               ADDRESS OF THE P.I.R. FIELD TO BE MOVED
0086  VALAD BSS 1               ADDRESS OF THE P.I.R. WORD  TO BE MOVED
0087  *
0088            END RDVAL
```

```
0001  FTN4X,L
0002  C*********************************************************
0003  C**                                                      **
0004  C**                                                      **
0005  C**              SUBROUTINE DARED(DATA,IB)               **
0006  C**                                                      **
0007  C**            THICKNESS DATA REDUCTION ROUTINE          **
0008  C**                                                      **
0009  C**  This subroutine accepts the raw data from the LFE program **
0010  C**  for segment thickness and converts it into a buffer con-  **
0011  C**  taining 24 lane thicknesses numbered from die bolt #1 to  **
0012  C**  die bolt #24.  First, the routine examines the data to    **
0013  C**  determine the locations of the two coating edges (where   **
0014  C**  the thickness goes high on either side of the film).      **
0015  C**  Then the number of segments between the two edges is      **
0016  C**  calculated and the appropriate number of segments dis-    **
0017  C**  carded on either side to result in 72 segments in the     **
0018  C**  middle of the film which comprise the middle 18 bolts (4  **
0019  C**  segments per bolt).  Finally the segments at the edges    **
0020  C**  are parcelled out as required to give thickness values    **
0021  C**  for lanes #1-#3 and #21-#24, which are the lanes which    **
0022  C**  experience neckdown.                                      **
0023  C**                                                      **
0024  C**                                                      **
0025  C**                                                      **
0026  C**                                                      **
0027  C**                                                      **
0028  C**                                                      **
0029  C*********************************************************
0030        SUBROUTINE DARED(DATA)
0031        DIMENSION DATA(150),THICK(24),DAT2(150)
0032        EXTERNAL THCUR,THSET
0033        INTEGER RGTEND
0034  C
0035  C
0036  C*****If average thickness is out of acceptable range, then exit.
0037  C
0038  C
0039        IF(DATA(1) .GT. 8.5 .OR. DATA(1) .LT. 5.0)GOTO 140
0040  C
0041  C
0042  C*****Find the right coating edge, RGTEND
0043  C
0044  C
0045        DO 100 I=3,20
0046        DIF=(DATA(I)-DATA(I-1))/DATA(1)
0047  C
0048  C*****The edge should be positive and have a slope of >30% of base
line.
0049  C
0050        IF(DIF .LE. .3)GOTO 100
0051        IF((DATA(I+1)-DATA(I))/DATA(1)          .LE. -.5)GOTO 10
0
0052  C     IF(DATA(I).GT. -1.)GOTO 101
0053        GOTO 101
0054    100 CONTINUE
0055  C
0056  C*****Couldn't find the edge!  Test segment #2.
0057  C
0058        IF(DATA(2).GT.-1)RGTEND=2
0059        IF(RGTEND .NE. 2)RGTEND=4
0060        GOTO 102
0061  C
0062  C*****The right edge was found to occur on segment #I.
0063  C
0064    101 RGTEND=I
```

```
0065      102 CONTINUE
0066   C
0067   C*****Now use the same technique to locate the left coating edge,
LFTEND
0068   C
0069          DO 103 I=2,20
0070          J= 98-I
0071          DIF=(DATA(J)-DATA(J+1))/DATA(1)
0072          IF(DIF .LE..3)GOTO 103
0073          IF((DATA(J-1)-DATA(J))/DATA(1)              .LE. -.5)GOTO 103
0074   C      IF(DATA(J).GT. -1.)GOTO 104
0075          GOTO 104
0076      103 CONTINUE
0077          IF(DATA( 97) .GT.-1)LFTEND=97
0078          IF(LFTEND .NE.  97)LFTEND= 92
0079          GOTO 105
0080   C
0081   C*****The left edge was located at segment #J.
0082      104 LFTEND=J
0083   C
0084      123 FORMAT(' LEFT,RIGHT: ',I4,2X,I4)
0085   C
0086   C*****Now add the scan average to each deviation to get actual thi
ckness(mils)
0087   C
0088      105 DO 120 I=2,105
0089          DAT2(I)=DATA(I)+DATA(1)
0090      120 CONTINUE
0091   C
0092   C*****Calculate the #segments of coating, RANGE.
0093   C
0094          WRITE(6,123)LFTEND,RGTEND
0095          RANGE=LFTEND-RGTEND
0096          IF(RANGE .GT. 72)GOTO 106
0097          L4EDGE=LFTEND
0098          ICUTL=0
0099          GOTO 107
0100   C
0101   C*****Establish the #segments of coating on left edge on bead, ICU
TL
0102   C
0103      106 ICUTL=(RANGE-72)/2
0104   C
0105   C*****Calculate segment # of Lane 4 edge, L4EDGE.
0106   C
0107          L4EDGE=LFTEND-ICUTL
0108   C
0109   C******For Lanes 4 to 21, calculate the average thickness of the 4
0110   C******segments making up that lane and put in buffer, THICK
0111   C
0112      107 DO 108 LANE=4,21
0113          SMLAN=0
0114          LANEST=L4EDGE-(LANE-4)*4
0115          DO 109 I=1,4
0116          LSEG=LANEST+1-I
0117          SMLAN=SMLAN+DAT2(LSEG)
0118      109 CONTINUE
0119          THICK (LANE)=SMLAN/4
0120      108 CONTINUE
0121          ICUTR=RANGE-72-ICUTL
0122          IF(ICUTR .LE. 0)ICUTR=0
0123   C
0124   C*****Now calculate the segments on coating representing the neckd
own
```

```
0125 C*****lanes (1-3 on left and 22-24 on right).  Use the following algorithm:
0126 C
0127 C                    Lane 3 or Lane 22 --- 50% of the bead width
0128 C                    Lane 2 or Lane 23 --- 65% of the remainder
0129 C                    Lane 1 or Lane 24 --- Remainder
0130 C
0131       LSEG3=INT(.5*ICUTL+.5)
0132       SMLAN=0
0133       DO 110 I=1,LSEG3
0134       SMLAN=SMLAN+DAT2(L4EDGE+I)
0135   110 CONTINUE
0136       THICK(3)=SMLAN/LSEG3
0137       L3EDGE=L4EDGE+LSEG3
0138       ICUT12=ICUTL-LSEG3
0139       LSEG2=INT(.65*ICUT12+.5)
0140       SMLAN=0
0141       DO 111 I=1,LSEG2
0142       SMLAN=SMLAN+DAT2(L3EDGE+I)
0143   111 CONTINUE
0144       THICK(2)=SMLAN/LSEG2
0145       L2EDGE=L3EDGE+LSEG2
0146       LSEG1=ICUT12-LSEG2
0147       IF(LSEG1 .LE. 0)GOTO 112
0148       SMLAN=0
0149       DO 113 I=1,LSEG1
0150       SMLAN=SMLAN+DAT2(L2EDGE+I)
0151   113 CONTINUE
0152       THICK(1)=SMLAN/LSEG1
0153       GOTO 114
0154   112 THICK(1)=THICK(2)
0155   114 LSEG22=INT(.5*ICUTR+.5)
0156       L22EDG=L4EDGE-73
0157       SMLAN=0
0158       DO 115 I=1,LSEG22
0159       SMLAN=SMLAN+DAT2(L22EDG +1-I)
0160   115 CONTINUE
0161       THICK(22)=SMLAN/LSEG22
0162       ICUT34=ICUTR-LSEG22
0163       LSEG23=INT(.65*ICUT34+.5)
0164       L23EDG=L22EDG-LSEG22
0165       SMLAN=0
0166       DO 116 I=1,LSEG23
0167       SMLAN=SMLAN+DAT2(L23EDG+1-I)
0168   116 CONTINUE
0169       THICK(23)=SMLAN/LSEG23
0170       LSEG24=ICUT34-LSEG23
0171       IF(LSEG24 .LE. 0)GOTO 117
0172       L24EDG=L23EDG-LSEG23
0173       SMLAN=0
0174       DO 118 I=1,LSEG24
0175       SMLAN=SMLAN+DAT2(L24EDG+1-I)
0176   118 CONTINUE
0177       THICK(24)=SMLAN/LSEG24
0178       GO TO 119
0179   117 THICK(24)=THICK(23)
0180   119 CONTINUE
0181 C
0182 C*****Fill the lane thickness buffer, THCUR, with the new calculated values.
0183 C
0184 C*****Now calculate the average thickness for lanes 4 to 21.
0185 C
0186       SUMR=0
0187       DO 308 I=4,21
0188   308 SUMR=SUMR+THICK(I)
```

```
0189            AVETH=SUMR/18
0190            CALL WRVAL(THCUR,THICK)
0191            DO 309 I=1,24
0192            CALL WRVAL(THSET,AVETH,I)
0193        309 CONTINUE
0194   C        WRITE(1,208)(THICK(L),L=1,24)
0195   C        WRITE(6,208)(THICK(L),L=1,24)
0196        208 FORMAT(15X,'LANE THICKNESS VALUES (mils)',/,3(2X,8(F6.3,1X),
/))
0197        140 RETURN
0198            END
0001   ASMB,L
0002            NAM WRVAL,6  WRITE VALUE(S)   TO  PIR DATA BASE
0003            EXT PIRSZ,DBADR,.ENTR
0004            ENT WRVAL
0005   ****************************************************************
**********
0006   *       WRITE A VALUE INTO THE P.I.R. DATA BASE FROM USER'S BUFFER
       *
0007   *
               *
0008   *       CALL WRVAL(FIELD, BUFFER)            WRITE VALUES FOR ALL PO
INTS(24) *
0009   *       CALL WRVAL(FIELD, VALUE, CHANNEL#)   WRITE ONLY CHANNEL#'S V
ALUE    *
0010   *
               *
0011   ****************************************************************
**********
0012   *
0013   FIELD BSS 1        P.I.R. DESIRED VALUE OR "FIELD"
0014   BUFFR BSS 1        USER'S BUFFER ADDRESS
0015   POINT BSS 1        P.I.R. NO. OR CHANNEL NO. DESIRED
0016   *
0017   WRVAL NOP
0018         JSB .ENTR
0019         DEF FIELD    GET PARAMETER ADDRESSES
0020   *
0021         CLB,INB
0022         LDA FIELD,I  GET DESIRED OFFSET INTO POINT RECORD
0023         ADA =D-2     IF OFFSET IS LESS THAN 2...
0024         SSA
0025         JMP *+4
0026         ADA =D-59    ... OR GREATER THAN 60, THEN ...
0027         SSA
0028         INB          ... NO. OF WORDS PER VALUE =1, ELSE=2.
0029         CMB,INB
0030         STB WDCNT    USE IT AS LOOP COUNTER
0031         STB SAVCT       ... & SAVE IT FOR LATER USE HERE
0032   *
0033         LDA BUFFR    SET UP USER-BUFFER POINTER ...
0034         STA BFPTR       ... FOR MOVING WORDS.
0035   *
0036   *     SET LOOP COUNTER FOR WRITING ALL OR ONE VALUE
0037         LDB =D24
0038         LDA POINT    GET ADDRESS IN "POINT"
0039         SZA          IF IT IS ZERO, ALL VALUES ARE REQUESTED
0040         CLB,INB
0041         CMB,INB
0042         STB LPCNT
0043   *
0044         SZA,RSS      IF NO POINT WAS GIVEN, GO GET IT ALL.
0045         JMP MPY
0046         LDA POINT,I  OTHERWISE, SET ADDRESS OF FIRST VALUE
0047         ADA =D-1       LESS ONE FOR GETTING ADDRESS
```

```
0048 MPY     MPY PIRSZ       TIME SIZE OF A POINT RECORD
0049         ADA DBADR
0050         ADA FIELD,I     ADD THE DESIRED OFFSET
0051         STA VADDR       SAVE THIS ADDRESS FOR LATER USE
0052         STA VALAD       = ADDRESS OF VALUE
0053 LOOP    LDA BFPTR,I     GET THE VALUE FROM THE USER'S BUFFER
0054         STA VALAD,I     PUT IT IN THE P.I.R.
0055 *
0056         ISZ BFPTR       INCREMENT BUFFER POINTER
0057         ISZ VALAD       INCREMENT ADDRESS OF VALUE(LOOK AT NEXT WORD)
0058         ISZ WDCNT       BUMP WORD COUNTER
0059         JMP LOOP        IF WORD COUNT NOT ZERO, MOVE ANOTHER WORD
0060 *
0061 *   IF MORE THAN ONE VALUE WAS REQUESTED, LOOP TO GET THEM
0062         LDA VADDR       GET ADDRESS OF LAST VALUE FIELD (OFFSET),
0063         ADA PIRSZ       ADD THE P.I.R. SIZE ...
0064         STA VADDR        ... TO GET ADDRESS OF NEXT POINT'S VALUE FIELD.
0065 *
0066         LDB SAVCT       RETRIEVE WORD COUNT
0067         STB WDCNT
0068 *
0069         ISZ LPCNT       HAVE WE GOTTEN EVERYTHING REQUESTED?
0070         JMP LOOP-1      IF NOT, KEEP GOING.
0071         CLA             ELSE, SET ADDRESS IN "POINT" TO ZERO FOR SUBSEQUENT CALLS
0072         STA POINT
0073         JMP WRVAL,I     RETURN
0074 *
0075 *
0076 *   DATA STORAGE
0077 *
0078 BFPTR BSS 1             POINTER INTO USER'S BUFFER
0079 WDCNT BSS 1             COUNT OF WORDS PER VALUE TO MOVE ( 1 OR 2 )
0080 SAVCT BSS 1             COPY OF ABOVE COUNT, DOES NOT CHANGE
0081 LPCNT BSS 1             LOOP COUNTER FOR ACCESSING ALL P.I.R.S OR JUST ONE
0082 VADDR BSS 1             ADDRESS OF THE P.I.R. FIELD TO BE MOVED
0083 VALAD BSS 1             ADDRESS OF THE P.I.R. WORD  TO BE MOVED
0084 *
0085         END WRVAL
&TSET T=00004 IS ON CR00031 USING 00004 BLKS R=0000

0001 FTN4,L
0002       EXTERNAL TPSET,TPACH,TPACL,THPRO,THDED,THWND,THSET
0003       WRITE(1,301)
0004   301 FORMAT('  DO YOU WISH TO CHANGE TEMP LOOP SETUP (1=YES)?')
0005       READ(1,102)ITLP
0006       IF(ITLP .NE. 1)GOTO 15
0007       WRITE(1,201)
0008   201 FORMAT('  CHANGE SETPOINT FOR ALL LOOPS? (1=YES)')
0009       READ(1,102)KSP
0010       IF(KSP .NE. 1)GOTO 202
0011       WRITE(1,203)
0012   203 FORMAT('  SETPOINT?')
0013       READ(1,9)TSP
0014       DO 204 I=1,24
0015       CALL WRVAL(TPSET,TSP,I)
0016   204 CONTINUE
0017   202 CONTINUE
0018       WRITE(1,101)
0019   101 FORMAT('  CHANGE LAMBDA FOR ALL LOOPS? (1=YES)')
0020       READ(1,102)KLAM
0021   102 FORMAT(I1)
0022       IF(KLAM .NE. 1)GOTO 103
0023       WRITE(1,105)
```

```
0024      105 FORMAT('  LAMBDA?')
0025          READ(1,9)TLAM
0026          DO 104 I=1,24
0027          CALL WRVAL(TPACH,TLAM,I)
0028      104 CONTINUE
0029      103 WRITE(1,106)
0030      106 FORMAT('  CHANGE DERIVATIVE TIME FOR ALL LOOPS? (1=YES)')
0031          READ(1,102)KDER
0032          IF(KDER .NE. 1)GOTO 107
0033          WRITE(1,108)
0034      108 FORMAT('  DERIVATIVE TIME?')
0035          READ(1,9)TTDER
0036          DO 109 I=1,24
0037          CALL WRVAL(TPACL,TTDER,I)
0038      109 CONTINUE
0039      107 IF(KLAM .EQ. 1 .AND. KDER .EQ. 1 .AND. KSP .EQ. 1)GOTO 302
0040          WRITE(1,1)
0041        1 FORMAT('  INDIVIDUAL LOOP (1) OR ALL LOOPS (2)?')
0042          READ(1,2)KIN
0043        2 FORMAT(I1)
0044          IF(KIN .EQ. 2)GOTO 3
0045          WRITE(1,4)
0046        4 FORMAT('  LOOP NO. (1 TO 24)?')
0047          READ(1,5)J
0048        5 FORMAT(I2)
0049          GOTO 7
0050        3 DO 6 J=1,24
0051          IF(KSP .EQ. 1)GOTO 151
0052        7 CALL RDVAL(TPSET,TSET,J)
0053          WRITE(1,8)J,TSET
0054        8 FORMAT('  BOLT NO.',I3,'  CURRENT SP: ',F10.0,' NEW SP?')
0055          READ(1,9)TSET
0056          CALL WRVAL(TPSET,TSET,J)
0057      151 IF(KLAM .EQ. 1)GOTO 110
0058          CALL RDVAL(TPACH,TLAM,J)
0059          WRITE(1,10) J,TLAM
0060        9 FORMAT(F10.0)
0061       10 FORMAT('  BOLT NO.',I3,' CURRENT LAMBDA:',F10.0,' NEW LAMBDA?')
0062          READ(1,9)TLAM
0063          CALL WRVAL(TPACH,TLAM,J)
0064      110 IF(KDER .EQ. 1)GOTO 111
0065          CALL RDVAL(TPACL,TTDER,J)
0066          WRITE(1,11)J,TTDER
0067       11 FORMAT('  BOLT NO.',I3,' CURRENT TD:',F10.0,' NEW TD?')
0068          READ(1,9)TTDER
0069          CALL WRVAL(TPACL,TTDER,J)
0070      111 CONTINUE
0071          IF(KIN .EQ. 1)GOTO 15
0072        6 CONTINUE
0073      302 CONTINUE
0074       15 WRITE(1,401)
0075      401 FORMAT('    THICKNESS LOOP SETUP')
0076          WRITE(1,402)
0077      402 FORMAT('  DO YOU WISH TO CHANGE THICKNESS LOOP SETUP(1=YES)')
0078          READ(1,403)ANS
0079      403 FORMAT(F10.0)
0080          IF(ANS .NE. 1)GOTO 156
0081          WRITE(1,404)
0082      404 FORMAT('  THICKNESS SETPOINT (mils):')
0083          READ(1,405)THS
0084          DO 505 I=1,24
0085          CALL WRVAL(THSET,THS,I)
0086      505 CONTINUE
0087          WRITE(1,406)
```

```
0088        406 FORMAT('   THICKNESS PROPORTIONAL BAND (%):')
0089            READ(1,405)THP
0090        405 FORMAT(F10.0)
0091            DO 506 I=4,21
0092            CALL WRVAL(THPRO,THP,I)
0093        506 CONTINUE
0094            WRITE(1,407)
0095        407 FORMAT('   THICKNESS LOOP RESET TIME (minutes):')
0096            READ(1,405)THD
0097            DO 507 I=1,24
0098            CALL WRVAL(THDED,THD,I)
0099        507 CONTINUE
0100            WRITE(1,408)
0101        408 FORMAT('   THICKNESS LOOP DERIVATIVE TIME (minutes):')
0102            READ(1,405)THW
0103            DO 508 I=1,24
0104            CALL WRVAL(THWND,THW,I)
0105        508 CONTINUE
0106            THI=THP*3
0107            DO 545 I=1,3
0108            K=25-I
0109            CALL WRVAL(THPRO,THI,I)
0110            CALL WRVAL(THRPO,THI,K)
0111        545 CONTINUE
0112        156 CALL EXIT
0113            END
0001    FTN4,L
0002            PROGRAM PARDM
0003            DIMENSION TPT(24)
0004            REAL KPT(24)
0005            EXTERNAL TPPRO,TPWND
0006            CALL RDVAL(TPPRO,KPT)
0007            CALL RDVAL(TPWND,TPT)
0008            DO 3 I=1,2
0009            M=0
0010            IF(I .EQ. 2)M=12
0011            WRITE(6,1)(KPT(J),J=M+1,M+12)
0012            WRITE(6,2)(TPT(J),J=M+1,M+12)
0013        3   CONTINUE
0014        1   FORMAT(' GAIN     :',12(F6.3,3X))
0015        2   FORMAT(' TIME CONS:',12(F6.1,3X))
0016            CALL EXIT
0017            END
```

What is claimed is:

1. A method for controlling an extrusion coating apparatus having an extrusion slot arranged to extrude a film subdivisible into a predetermined number of transversely contiguous lanes, a first one of the lanes being disposed within a predetermined range of contiguity to a lateral edge of the film while a second one of the lanes is transversely interior therefrom, the extrusion apparatus having a first and a second heat responsive element responsive to the flow of electric current to expand to an extent corresponding to the magnitude of the current to modify the thickness of the slot respectively associated with the first and second lanes, comprising the steps of
   (a) monitoring the thickness of the extrudate in the second lane; and
   (b) generating a temperature set point for both the first and second heat responsive elements in accordance with the monitored thickness of the extrudate in the second lane, the temperature set point for the first heat responsive element being functionally related to the set point for the second heat responsive element.

* * * * *